US007001709B2

(12) United States Patent
Masuda et al.

(10) Patent No.: US 7,001,709 B2
(45) Date of Patent: Feb. 21, 2006

(54) METHOD OF DRAWING A PATTERN ON A BASE MATERIAL BY SCANNING A BEAM

(75) Inventors: Osamu Masuda, Hino (JP); Kazumi Furuta, Akishima (JP)

(73) Assignee: Konica Corporation, Tokyo (JP)

( * ) Notice: Subject to any disclaimer, the term of this patent is extended or adjusted under 35 U.S.C. 154(b) by 117 days.

(21) Appl. No.: 10/392,667

(22) Filed: Mar. 20, 2003

(65) Prior Publication Data
US 2003/0183961 A1 Oct. 2, 2003

(30) Foreign Application Priority Data
Mar. 28, 2002 (JP) .............................. 2002-090858
Mar. 28, 2002 (JP) .............................. 2002-090859

(51) Int. Cl.
B23K 15/00 (2006.01)
H01J 37/302 (2006.01)
(52) U.S. Cl. ...................... 430/296; 430/320; 430/321; 430/322; 219/121.12; 219/121.19; 219/121.2; 250/492.22
(58) Field of Classification Search ................ 430/320, 430/321, 322, 296; 219/121.12, 121.19, 219/121.2; 264/2.5, 485; 205/70; 250/492.22
See application file for complete search history.

(56) References Cited

U.S. PATENT DOCUMENTS 5,114,513 A * 5/1992 Hosokawa et al. ......... 156/150
2002/0170887 A1 * 11/2002 Furuta et al. .......... 219/121.19

FOREIGN PATENT DOCUMENTS

JP 08-095231 * 4/1996

* cited by examiner

Primary Examiner—Thorl Chea
(74) Attorney, Agent, or Firm—Frishauf, Holtz, Goodman & Chick, P.C.

(57) ABSTRACT

A method of drawing a pattern on a base material by scanning a beam, comprising: drawing a pattern including ring-shaped zones on a first pattern-drawn field on a base material by scanning a beam on a first pattern-drawn field; shifting at least one of the beam source and the base material to scan the beam on a second pattern-drawn field located next to the first pattern-drawn field in such a way that a boundary between the first pattern-drawn field and the second pattern-drawn field is positioned at a joint portion between a slope portion and a side wall portion of the ring-shaped zones; and drawing the pattern on the second pattern-drawn field by scanning a beam so that the joint portion between the slope portion and the side wall portion is drawn at the boundary between the first pattern-drawn field and the second pattern-drawn field.

16 Claims, 17 Drawing Sheets

PATTERN DRAWING LINE

THE SECOND PATTERN
-DRAWN FIELD B

THE FIRST PATTERN
-DRAWN FIELD A

METHOD OF DRAWING A PATTERN ON A BASE MATERIAL BY SCANNING A BEAM

BACKGROUND OF THE INVENTION

The present invention relates to a method of drawing a pattern on a base material by scanning a beam, and a pattern drawing apparatus using an electron beam, and in particular, to those which can draw a microscopic pattern.

In recent years, in the field of optical pickup devices, which has developed quickly, used are optical elements such as an extremely precise objective lens and the like. By molding the optical elements from a material such as a plastic or glass with metal molding dies, it is possible to quickly produce uniform products, and accordingly it can be said that metal molds are suitable for mass production. Generally, the metal molding dies are mainly manufactured, being cut section by section, with monocrystal diamond tools. However, such metal molding dies are consumable items which are worn away based on the number of usage, and it is necessary to exchange the metal molding dies periodically. Accordingly, an identical metal molding die must be prepared for the exchange, however, when such metal molding dies are manufactured by cutting conducted with monocrystal diamond tools, it is very difficult to cut the identical metal molding dies, and further, there is the problem that the form of the optical element products vary widely before and after the exchange, and in addition, it is very expensive, which is another problem.

To overcome these problems, there is a trial to form the metal molding dies in such a way that electroforming is allowed to grow on the basic configuration having the base optical surface corresponding to the optical surface of the optical element. According to the trial, however microscopic a pattern formed on the base optical surface of the basic configuration may be, it is possible to mold the pattern with high precision.

The pattern of the basic configuration used for the above-mentioned usage can be produced in such a way that a resist is coated on the base optical surface of a base material as an object of pattern drawing (hereinafter referred to as a base material), a microscopic pattern is formed by pattern drawing using an electro beam, the resist is developed, and the pattern can be produced by a dry etching method. After the basic configuration is adhered onto a jig, the electroforming is grown so as to cover the base optical surface of the basic configuration, and an electroforming member, as the desired metal molding die, is formed.

Originally, since the pattern drawing using the electro beam is one which forms the microscopic pattern, the beam scanning area (pattern-drawn field on which a pattern is drawn by scanning a beam) for one operation is 0.5×0.5 mm, which is an extremely small area. On the other hand, an optical element such as an objective lens for the optical pickup device is about 3 mm diameter, and the base optical surface of the base material is sized depending on the optical element, and thereby, it is not possible to form the microscopic pattern on the base optical surface of the base material in one operation. Due to this, a drawing method has been devised in which after the drawing is completed in one scanning area of the electro beam, an electro beam emitting source and the base material are relatively shifted to an adjacent scanning area, and the drawing is continued there. This is called a step and repeat method.

When a pattern that is drawn in one scanning area is to be continuous with a pattern drawn in the adjacent scanning area, the problem is how to precisely draw bordering sections. Regarding the drawing of such continuous patterns, dose quantity of the electron beam (this is shown by an electron radiating amount for one unit area) should be nearly equal, from the bordering section of a preceding pattern that is drawn in the one scanning area, to the succeeding pattern drawn in the adjacent scanning area, where it touches the bordering section of the preceding pattern. Even if the dose quantity of the electron beam were established as mentioned above, the electron beam has characteristics in that radiating direction changes with temperature, magnetic field, and vibration. When the drawing is conducted, such drawbacks can be happened that the bordering section of the preceding pattern is overlapped by the bordering section of the succeeding pattern, or the bordering section of the preceding pattern is separated from the bordering section of the succeeding pattern. In case of the former drawback, the dose quantity becomes excessive in the bordering section, and in case of the latter drawback, the dose quantity becomes extremely small in the bordering section, and whichever may happen, the patterns will not be continuous, which influences formation of the ring-shaped diffractive zone shaped to be ideal. (FIGS. 1(A) and 1(B), see below for further details)

SUMMARY OF THE INVENTION

The present invention has been achieved in view of the above-mentioned conventional technology, and the object of the present invention is to provide a method of drawing a pattern on a base material by scanning a beam and a pattern drawing apparatus using an electron beam which can produce an appropriate form, without excessive cost up nor prolonging manufacturing time.

The above object can be attained by the following methods.

(1) A method of drawing a pattern on a base material by scanning a beam emitted from a beam source, wherein the pattern includes a plurality of ring-shaped diffractive zones each of which is formed by a slope portion and a side wall portion jointed with the slope portion; comprises:

a first pattern drawing step of drawing a pattern including ring-shaped diffractive zones on a first pattern-drawn field on the base material by scanning a beam emitted from the beam source on the first pattern-drawn field;

a shifting step of shifting at least one of the beam source and the base material relatively to the other one to scan the beam on a second pattern-drawn field located next to the first pattern-drawn field in such a way that a boundary between the first pattern-drawn field and the second pattern-drawn field is positioned at a joint portion between a slope portion and a side wall portion; and a second pattern drawing step of drawing the pattern on the second pattern-drawn field by scanning a beam emitted from the beam source so that the joint portion between the slope portion and the side wall portion is drawn at the boundary between the first pattern-drawn field and the second pattern-drawn field.

(2) A method of manufacturing a master die to form a die to produce an optical element, comprises the steps of (1) and further comprises:

a coating step of coating the base optical surface of the base material with a resist layer before conducting drawing a pattern with a beam according to the method of claim 1; and a developing step of developing the resist layer on the base optical surface of the base material after conducting drawing the pattern on the resist layer with a beam according to the method of claim 1 to form a pattern corresponding to the optical surface of the optical element on the base optical surface so that a master die having the pattern corresponding to the optical surface of the optical element is obtained.

(3) A method of drawing a pattern on a base material by scanning a beam emitted from a beam source, wherein the pattern includes a plurality of ring-shaped diffractive zones each of which is formed by a slope portion and a side wall portion jointed with the slope portion, comprises:

a field calculating step of calculating field coordinates to divide a base optical surface into at least a first pattern-drawn field and a second pattern-drawn field located next to the first pattern drawn-field in accordance with a scanning width of a beam on a basis of configuration data of the base optical surface on the basic material and pattern data of the plurality of ring-shaped diffractive zones, determining the field coordinates of the first pattern-drawn field and the second pattern-drawn field, and storing first field coordinate data of the first pattern-drawn field and second field coordinate data of the second pattern-drawn field in a storing section, wherein in the field calculating step, the field coordinates are determined such that the boundary between the first pattern-drawn field and the second pattern-drawn field is located at a joint portion between the slope portion and the side wall portion;

a first accessing step of accessing the first field coordinate data of the first pattern-drawn field in the storing section;

a first shifting step of shifting at least one of the beam source and the base material relatively to the other one based on the accessed first field coordinate data so as to scan the first pattern-drawn field with a beam;

a first dose distribution calculating step of calculating a first dose distribution for the first pattern-drawn field on a basis of the first field coordinate data and the pattern data of the plurality of ring-shaped diffractive zones;

a first pattern drawing step of drawing a pattern including ring-shaped diffractive zones on the first pattern-drawn field by scanning a beam emitted from the beam source on the first pattern-drawn field on a basis of the first dose distribution;

a second accessing step of accessing the second field coordinate data of the second pattern-drawn field in the storing section;

a second shifting step of shifting at least one of the beam source and the base material relatively to the other one based on the accessed second field coordinate data so as to scan the second pattern-drawn field with a beam;

a second dose distribution calculating step of calculating a second dose distribution for the second pattern-drawn field on a basis of the second field coordinate data and the pattern data of the plurality of ring-shaped diffractive zones; and a second pattern drawing step of drawing a pattern including ring-shaped diffractive zones on the second pattern-drawn field by scanning a beam emitted from the beam source on the second pattern-drawn field on a basis of the second dose distribution.

BRIEF DESCRIPTION OF THE DRAWINGS

FIGS. 11(A) and 11(B) are explanatory drawings showing a base material on which a pattern is to be drawn by the pattern drawing apparatus using an electron beam shown in FIG. 6, while FIG. 11(C) is an explanatory drawing explaining the principle of pattern drawing.

DETAILED DESCRIPTION OF THE PREFERRED EMBODIMENT

Figure 1:
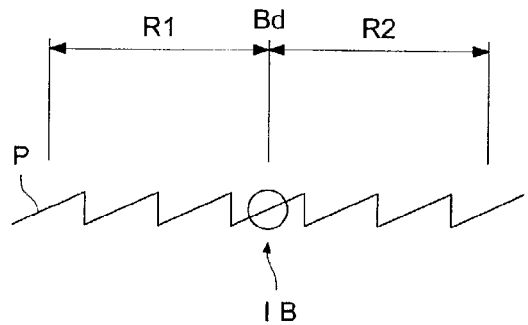
FIG. 1(A) is a cross section of pattern P of a ring-shaped diffractive zone which is formed by a pattern drawing using an electron beam, using methods of conventional technology.
FIG. 1(B) is an enlarged drawing of section I(B) in FIG. 1(A).
Figure 1:
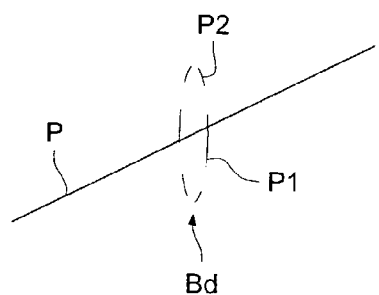

The principle of the present invention will be explained below, referring to the drawings. FIG. 1(A) is a graph corresponding to a cross section of pattern P of a ring-shaped diffractive zone which is formed by pattern drawing using an electron beam, using methods of conventional technology, while FIG. 1(B) is an enlarged drawing of section I(B) in FIG. 1(A).

Figure 2:
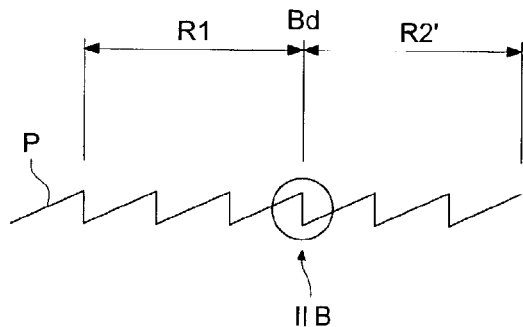
FIG. 2(A) is a cross section of pattern P of a ring-shaped diffractive zone which is formed by a beam drawing method, using the method of the present invention.
FIG. 2(B) is an enlarged drawing of section II(B) in FIG. 2(A).
Figure 2:
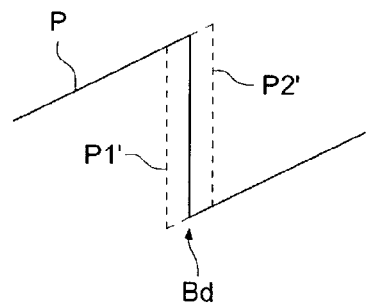

FIG. 2(A) is a cross section of pattern P of a ring-shaped diffractive zone which is formed by the pattern drawing using an electron beam, employing the pattern drawing method using an electron beam of the present invention, and FIG. 2(B) is an enlarged drawing of section II(B) in FIG. 2(A). Where, the higher the dose quantity of the beam, the lower the height of pattern P, and accordingly, desired pattern P can be formed by changing the dose quantity of the radiating beam, corresponding to the shapes of the patterns shown in FIGS. 1 and 2.

In FIG. 1, one pattern-drawn field (first pattern-drawn field) R1 and other pattern-drawn field (second pattern-drawn field) R2 are adjacent to each other, and border Bd for them is a slope (a slanting portion: the height of the pattern increases or decreases successively, or changes continuously) of pattern P. When the beam position of pattern-drawn field R2 extends beyond pattern-drawn field R1, the last beam (the right end in FIG. 1(A)) of pattern-drawn field R1 overlaps with the first beam (the left end in FIG. 1(A)) of pattern-drawn field R2, and thereby the dose quantity increases excessively in border Bd, causing a shaved off portion on the slope of pattern P, as shown by a dotted line P1 in FIG. 1(B). On the other hand, when the last beam (the right end in FIG. 1(A)) of pattern-drawn field R1 separates from the first beam (the left end in FIG. 1(A)) of pattern-drawn field R2, the dose quantity decreases excessively in border Bd, causing a shaved off portion on the slope of pattern P, as shown by a dotted line P2 in FIG. 1(B). Whichever case happens, a defect results. When the above-mentioned base material is finally used for the formation of an optical element, similar defects will be formed on the optical surface, which deteriorates quality of the outside appearance and the optical characteristics.

However, in FIG. 2, border Bd between pattern-drawn field R1 and pattern-drawn field R2 is exactly on a connecting portion (a discontinuous portion in the relationship between the beam radiated point and dose quantity or its vicinity) of a slope (a substantially slanting portion: a surface parallel to an advancing beam,) of pattern P and a perpendicular surface (a side wall portion: a portion where the height of the pattern is partially discontinuous, or a portion where the slope portion is bended) of pattern P. Accordingly, when the beam position of pattern-drawn field R2 extends beyond pattern-drawn field R1, the last beam (the right end in FIG. 2(A)) of pattern-drawn field R1 overlaps with the first beam (the left end in FIG. 2(B)) of pattern-drawn field R2, however, only shortened is the left slope of pattern P, which is shown by dotted line P1' in FIG. 2(B), though the dose quantity increases in border Bd. On the other hand, when the last beam (the right end in FIG. 2(A)) of pattern-drawn field R1 separates from the first beam (the left end in FIG. 2(B)) of pattern-drawn field R2, only prolonged is the left slope on pattern P, as shown by dotted line P2' in FIG. 2(B), though the dose quantity decreases in border Bd. Accordingly, the shape of pattern P is totally retained, and when such a base material is finally used for the formation of an optical element, quality of the outside appearance of the optical element is increased and the reduction of the optical characteristics of the optical element can be controlled.

Further, it is preferable that the above-mentioned beam is an electron beam. Electron beam means an electron beam that is controlled by an electron lens.

Still further, it is preferable that the above-mentioned electron beam is radiated onto a curved surface on the base material. On this surface, there are many cases where the distance between the base material and the electron beam is changed for the purpose of adjusting the focal point of the electron beam. This is because, when a XYZ stage, on which the base material is mounted, is physically shifted in the direction of Z (nearly equal to the traveling direction of the electron beam), it is possible that the position of pattern-drawn fields R1 and R2 will extend beyond the specified position.

The above-mentioned pattern is drawn to form a plurality of concentric circular ring-shaped diffractive zones, each ring-shaped diffractive zone is formed of a slope portion expanding in the radius direction and a side wall portion connecting to the slope portion, and it is preferable that the border between the above mentioned pattern-drawn field and the other pattern-drawn field is located at a portion corresponding to the connecting portion of the slope portion and the side wall portion, or located at its vicinity.

The above-mentioned base material is a material for the metal molding die to mold the optical element, or it is the material for the basic configuration to form the metal molding die, and it is preferable that the ring-shaped diffractive zone is formed corresponding to the optical surface of the optical element.

In the following, a suitable example of the embodiment will be explained specifically with reference to the drawings.

Figure 3:
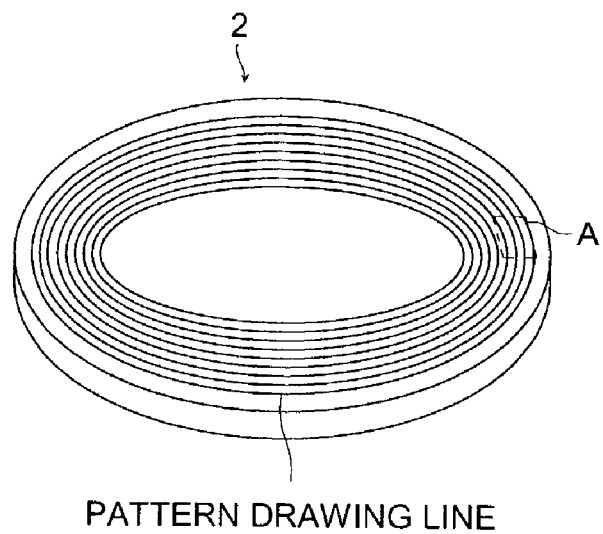
FIG. 3 is an explanatory drawing showing an example of the outline structure of a base material of the present invention.

First, a base material as an object of pattern drawing to which pattern drawing is applied by an electron beam will be explained with reference to FIG. 3 and FIG. 4. In FIG. 3, a pattern to be drawn on a base material and the pattern shape of its detailed part are disclosed.

Figure 4:
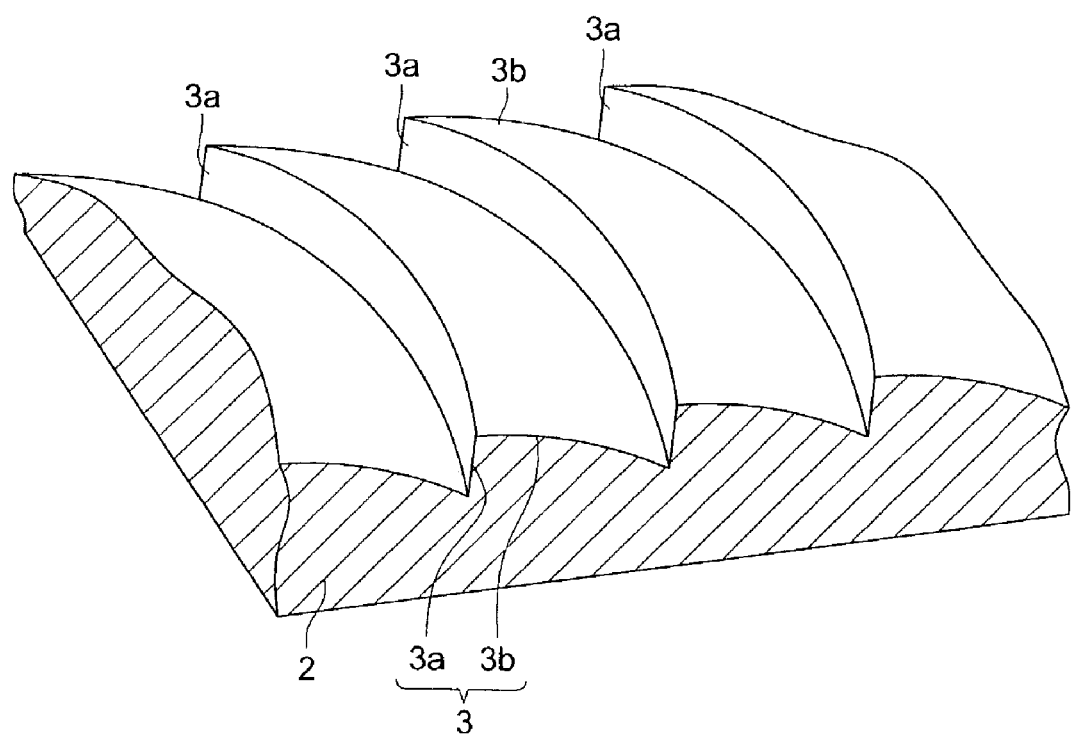
FIG. 4 is an explanatory drawing showing details of the essential parts of the base material shown in FIG. 3.

As shown in the drawing, a ring-shaped diffractive zone represented by a circular pattern is disclosed as an example of a pattern to be drawn on a base material as an object of pattern drawing 2 (hereinafter referred to simply as a base material) of this example of the embodiment, and as shown in an enlarged view of the part A, which is a part of pattern drawing portion of the base material 2, the base material 2 has a ring-shaped diffractive zone formed of a plurality of blazes 3 as shown in FIG. 4.

Figure 5:
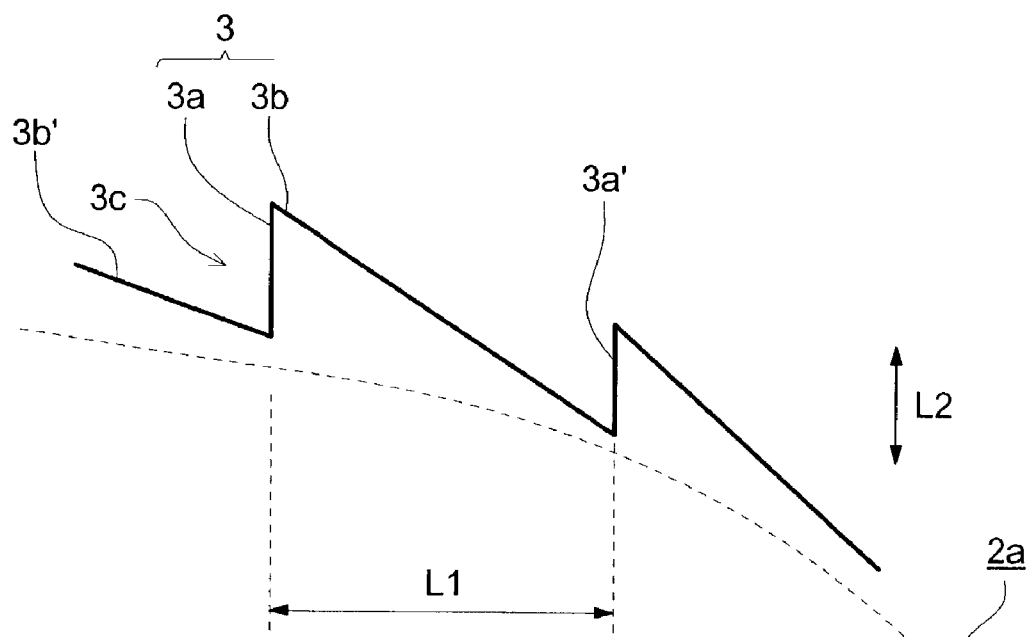
FIG. 5 is a schematic cross section of a ring-shaped diffractive zone.

Blazes 3 form the shape in which slope portion 3b and side wall portion 3a are connected repeatedly. To state it in more detail, as shown in FIG. 5, the base material 2 has a curved surface portion 2a (a base optical surface of base material) formed at least on one surface, has a diffractive grating having a pitch of L1 per each blaze unit formed with a tilt; at least in one blaze unit of this diffractive grating having a length L1, the side wall portion 3a rising upward from said curved surface portion 2a at one end position of said blaze unit, a slope portion 3b formed between neighboring side walls 3a and 3a' of said blaze unit, and a groove portion 3c formed in the border space between the side wall portion 3a and the slope portion 3b' are included. In addition, it is desirable that this ring-shaped diffractive zone is formed by the pattern drawing applied to a coating layer (a resist) coated on the curved surface portion 2a.

A macromolecule resin material, which is hardened by heating or ultra violet rays, is used for the resist, having the characteristics that a link between adjacent molecules is cut and decomposed, based on the quantity of energy of an electron beam. (The decomposed section is eliminated by an developer mentioned later.)

Figure 18:
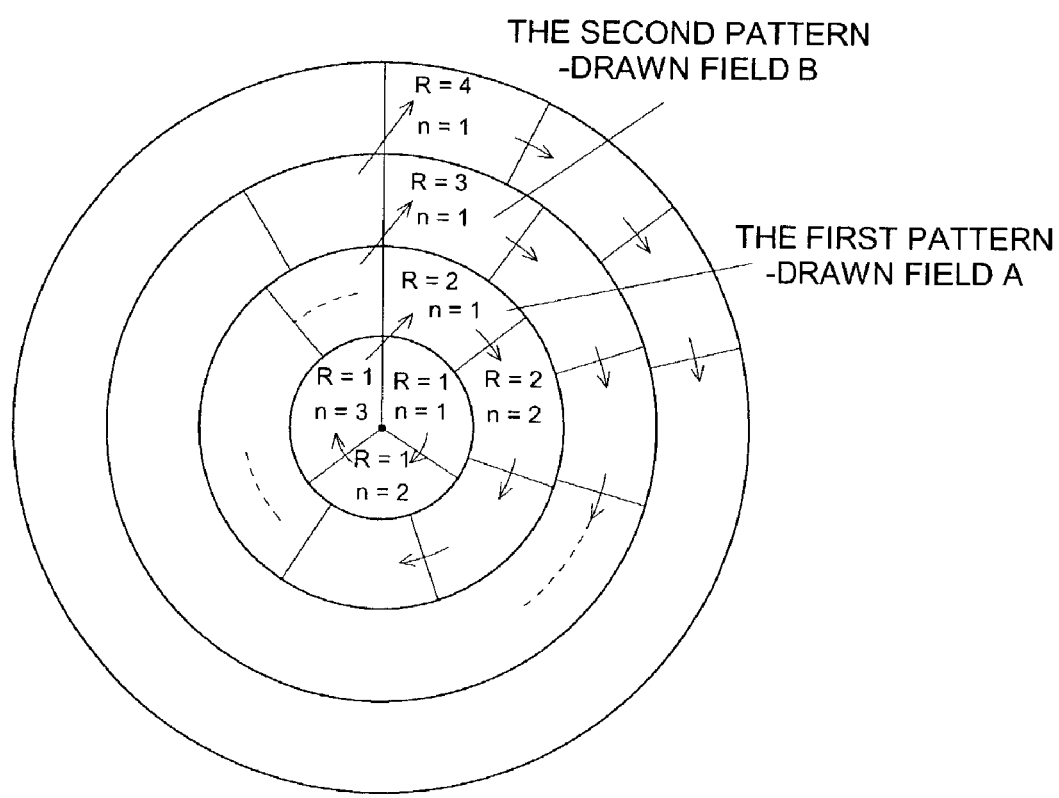
FIG. 18 is a plan view showing the pattern-drawn field of the base material.

In the step and repeat method of the present invention, the area where the pattern is drawn on the base material shown in FIG. 3 is divided into a plurality of fields (pattern-drawn fields) as shown in FIG. 18. Successively repeated is the step of pattern drawing by an electron beam on every field, and the step of the relative shift of the beam and base material, then the predetermined pattern (the ring-shaped diffractive zone, in this case) is drawn on the base material.

Specifically, each field is arranged to be concentrically circular and is fan-shaped, based on the ring-shaped diffractive zone to be drawn. The fields, arranged to be concentrically circular, are arranged to range in the radius direction of the concentric circle from the center of the concentric circles of the ring-shaped diffractive zone (for example, first pattern-drawn field A and second pattern-drawn field B in FIG. 18). In such a way, as mentioned above, the pattern-drawn field on the base material is divided into a plurality of pattern-drawn fields. As understood by FIG. 18, the number of the fields arranged in the radius direction is variable, based on the size of the base material on which the pattern is drawn, and the distance which the beam can scan.

In the present invention, among the plurally divided fields, the relationship between the adjacent fields in the radius direction and the pattern, is mainly determined beforehand so that the appropriate drawing can be performed, even when the beam is shifted over the passage of time, or the clearance between each field is varied.

It is preferable that base material 2 is a material of the basic-configuration for forming the metal molding die that molds the optical element such as an objective lens for an optical pickup device.

A plurality of identical metal molding dies can be produced by the basic configuration which is produced by the above-mentioned pattern drawing. Accordingly when the metal molding die is changed to a new one, it is possible to prevent the products of the optical element from changing in size.

On the optical pickup device which can attain the interchageability of DVD and CD by using information recording rays of different wavelengths, to correct for aberration, the ring-shaped diffractive zone is provided on such an optical element. Described below is the concrete structure of the pattern drawing apparatus using an electron beam which is a premise for the formation of the base material.

(The Overall Structure of a Pattern Drawing Apparatus Using an Electron Beam)

Figure 6:
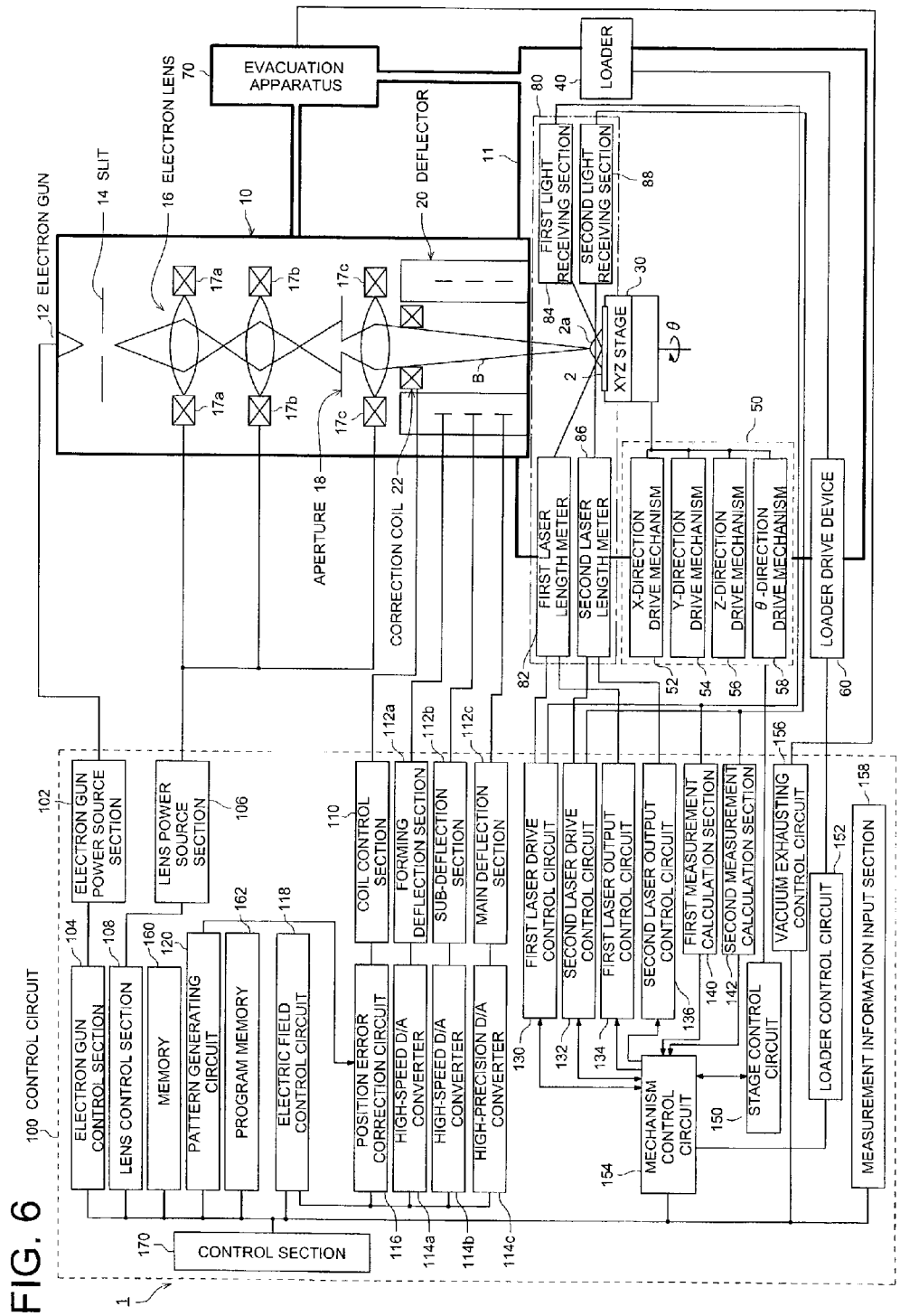
FIG. 6 is an explanatory drawing showing the whole outline structure of the pattern drawing apparatus using an electron beam.

The outline structure of the whole of a pattern drawing apparatus using an electron beam will be explained with reference to FIG. 6. FIG. 6 is an explanatory drawing showing the overall structure of a pattern drawing apparatus using an electron beam of this example.

The pattern drawing apparatus using an electron beam 1, as shown in FIG. 6, scans a base material 2 as the object of pattern drawing at a high speed with a high-current electron beam probe having a high resolving power formed, and has a structure comprising an electron gun 12 as an electron beam generating means, which forms an electron beam probe having a high resolving power and generates an electron beam to practice a beam irradiation on a target, a slit 14 for letting an electron beam from the electron gun 12 pass, an electron lens 16 for controlling the focus position of the electron beam passing through the slit 14 with respect to said base material 2, an aperture 18 disposed at a position on the path through which an electron beam is emitted, a deflector 20 for controlling the scanning position on the base material 2 as the target, etc. by deflecting an electron beam, and a correction coil for correcting deflection. Besides, these parts are arranged inside a lens-barrel 10 and are maintained in a vacuum state while an electron beam is emitted.

Moreover, the pattern drawing apparatus using an electron beam 1 has a structure further comprising an XYZ stage 30 as a carrying table for placing a base material 2 as an object of pattern drawing on it, a loader 40 as a conveyance means for conveying a base material 2 to the setting position on the XYZ stage 30, a measurement apparatus 80 as a measuring means for measuring the reference points on the surface of a base material 2 on the XYZ stage 30, a stage driving means 50 as a drive means for driving the XYZ stage 30, a loader driving means 60 for driving the loader, an evacuation apparatus 70 for carrying out exhaustion to make vacuum the inside of the lens-barrel 10 and the inside of a case 11 including the XYZ stage, and a control circuit 100 as a control means for conducting the control of these.

Further, as regards the electron lens 16, a plurality of electronic lenses are generated by the electric currents energizing the respective coils 17a, 17b, and 17c placed separately at plural positions along the height direction, and they are controlled by the electric currents respectively, to control the focus position of an electron beam.

The measuring apparatus 80 has a structure comprising a first laser length meter (length measuring device) 82 for measuring a base material 2 by the application (irradiation) of a laser beam to the base material 2, a first light receiving unit 84 for receiving a laser beam which is emitted by the first laser length meter 82 (a first irradiation light) and is reflected by the base material 2, a second laser length meter 86 for carrying out irradiation at an angle of incidence different from that of the first laser length meter 82, and a second light receiving section 88 for receiving a laser beam which is emitted by the second laser length meter 86 (a second irradiation light) and is reflected by the base material 2.

The stage driving means 50 has a structure comprising an X-driving mechanism 52 for driving the XYZ stage in the X direction, a Y-driving mechanism 54 for driving the XYZ stage in the Y direction, a Z-driving mechanism 56 for driving the XYZ stage in the Z direction, and a θ-driving mechanism 58 for driving the XYZ stage in the θ direction. By means of these, it is possible to shift the XYZ stage three-dimensionally, or to make an alignment.

When base material 2 is mounted on XYZ stage 30, the relative position to electron gun 12 as beam radiating source can be changed freely so that the pattern drawing is effected by the step and repeat method.

The control circuit 100 has a structure comprising an electron gun power source section 102, an electron gun controlling section 104 for adjusting and controlling the electric current and voltage in the electron gun power source section 102, a lens power source section 106 for energizing the electron lens 16 (each of the plural electronic lenses), and a lens control section 108 for adjusting and controlling the electric currents corresponding to the respective electronic lenses in this lens power source section 106.

Further, the control circuit 100 has a structure further comprising a coil controlling section 110 for controlling the correction coil 22, a forming deflection section 112a for carrying out the deflection in the forming direction, sub-deflection section 112b for carrying out the deflection in the sub-scanning direction by the deflector 20, a main deflection section 112c for carrying out the deflection in the main scanning direction by the deflector 20, a high-speed D/A converter 114a for converting a digital signal into an analogue signal in order to control the forming deflection section 112a, a high-speed D/A converter 114b for converting a digital signal into an analogue signal in order to control the sub-deflection section 112b, and a high-precision D/A converter 114c for converting a digital signal into an analogue signal in order to control the main deflection section 112c.

Further, the control circuit 100 has a structure further comprising a positional error correcting circuit 116 for correcting a positional error in the deflector 20, in other words, for urging the correction of a positional error by supplying a positional error correction signal etc. to each of the high-speed D/A converters 114a and 114b, and the high-precision D/A converter 114c, or carrying out the correction of a positional error by the correction coil 22 through supplying the above-mentioned signals to the coil controlling section 110, an electric field controlling circuit 118 as an electric field controlling means for controlling the electric field of an electron beam through controlling this positional error correcting circuit 116, the high-speed D/A converter 114a and 114b, and the high-precision D/A converter 114c, and a pattern generating circuit 120 for generating a pattern to be drawn etc. for the above-mentioned base material.

Furthermore, the control circuit 100 has a structure further comprising a first laser drive controlling circuit 130 for carrying out the drive control of the movement of the laser irradiation position, the incident angle of the irradiation laser, etc. through moving the first laser length meter 82, a second laser drive controlling circuit 132 for carrying out the drive control of the movement of the laser irradiation position, the incident angle of the irradiation laser, etc. through moving the second laser length meter 86, a first laser output controlling circuit 134 for adjusting and controlling the output (the light intensity of a laser beam) of the irradiation laser beam at the first laser length meter 82, a second laser output controlling circuit 136 for adjusting and controlling the output of the irradiation laser beam at the second laser length meter 86, and a first measurement calculation section 140 for calculating the result of the measurement on the basis of the result of light receiving at the first light receiving unit 84, and a second measurement calculation unit 142 for calculating the result of the measurement on the basis of the result of light receiving at the second light receiving section 88.

Furthermore, the control circuit 100 has a structure further comprising a stage control circuit 150 for controlling the stage driving means 50, a loader control circuit 152 for control the loader driving apparatus 60, a mechanism control circuit 154 for controlling the above-mentioned first and second laser driving circuits 130 and 132, first and second laser output control circuits 134 and 136, first and second measurement calculation sections 140 and 142, stage control circuit 150, and loader control circuit 152, an evacuation control circuit 156 for controlling the evacuation of the evacuation apparatus 70, measurement information inputting section 158 for inputting measurement information, a memory 160 as a memory means for memorizing inputted information and other plural kinds of information, a program memory 162 memorizing a control program for practicing various kinds of controls, and a control section 170 conducting the control of the above-mentioned various parts formed of, for example, a CPU or the like.

In the pattern drawing apparatus using an electron beam 1 having a structure as described in the above, when a base material 2, having conveyed by the loader 40, is placed on the XYZ stage 30, the air and dusts etc. in the lens-barrel 10 and the case 11 are exhausted by the evacuation apparatus 70, and then, an electron beam is emitted from the electron gun 12.

The electron beam, having been emitted from the electron gun 12, is deflected by the deflector 20 through the electron lens 16; the deflected electron beam B (hereinafter, only the electron beam that has been controlled to be deflected after it passed the electron lens 16 is sometimes referred to as "the electron beam B" with a sign B attached) is applied to the surface of a base material 2 on the XYZ stage 30, for example, to the pattern drawing position on the curved surface area (curved surface) 2a, to practice pattern drawing.

At this time, the parameters of the pattern drawing position on the base material 2 (at least a heightwise position or a position data with regard to height among the drawing position parameters) or the positions of the reference points to be described later are measured; the control circuit 100 adjusts and controls the value of the electric currents flowing in the coils 17a, 17b, and 17c of the electron lens 16 etc., to control the position within the depth of the focus, that is, the focus position, which is controlled to come to the above-mentioned pattern drawing position.

In another way, on the basis of the result of measurement, the control circuit 100 shifts the XYZ stage 30 to make the focus position of the above-mentioned electron beam B agree with the above-mentioned pattern drawing position by controlling the stage driving means 50.

The present example can be effected by either the control of an electron beam or the control of XYZ stage 30, or can be effected by both.

(Measurement Apparatus)

Next, the measurement apparatus 80 will be explained with reference to FIGS. 7 to 9. To state it in more detail, as shown in FIG. 7, the measurement apparatus 80 comprises the first laser length meter 82, the first light receiving section 84, the second laser length meter 86, the second light receiving section 88, etc.

By means of the first laser length meter 82, the first light beam S1 is applied to the base material 2 from the direction crossing the electron beam, and the first light intensity distribution is detected by receiving the first light beam S1 transmitting the base material 2.

Figure 7:
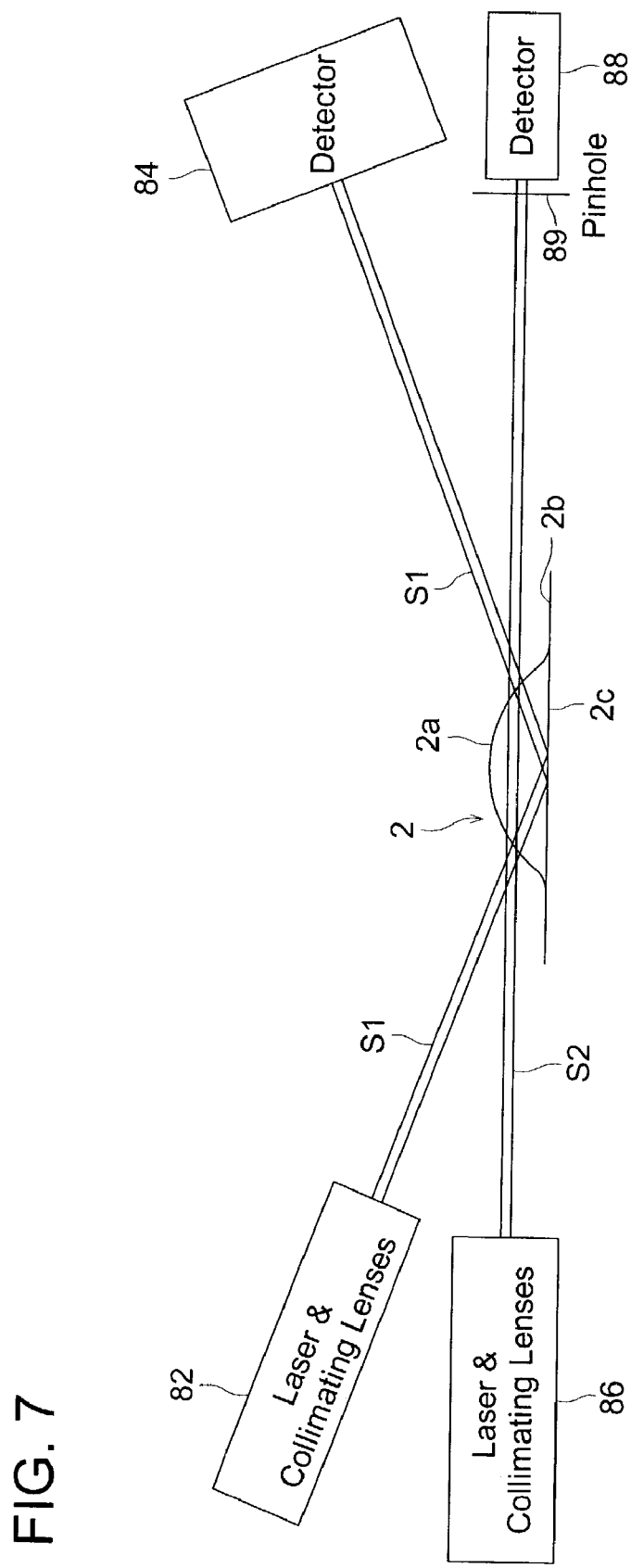
FIG. 7 is an explanatory drawing explaining the principles of a measurement apparatus.

At this time, as shown in FIG. 7, it is understood that, because the first light beam S1 is reflected by the bottom portion 2c of the base material 2, the position (height) of the flat portion 2b of the base material 2 is measured and calculated on the basis of the first light intensity distribution. However, in this case, the position (height) of any point on the curved surface portion 2a of the base material cannot be measured.

Therefore, in this example, the second laser length meter 86 is further provided. That is, by means of the second laser length meter 86, the second light beam S2 is applied to the base material 2 from the direction approximately perpendicular to the electron beam, which is different from the first light beam S1, and the second light intensity distribution is detected by receiving the second light beam transmitted by the base material 2 through a pinhole 84 provided in the second light receiving section 88.

In this case, as shown in FIG. 8(A) to FIG. 8(C), because the second light beam S2 is transmitted through a point on the curved surface portion 2a, the position (height) of the point on the curved surface portion 2a projecting from the flat portion 2b of the base material 2 can be measured and calculated on the basis of the above-mentioned second light intensity distribution.

Figure 8:
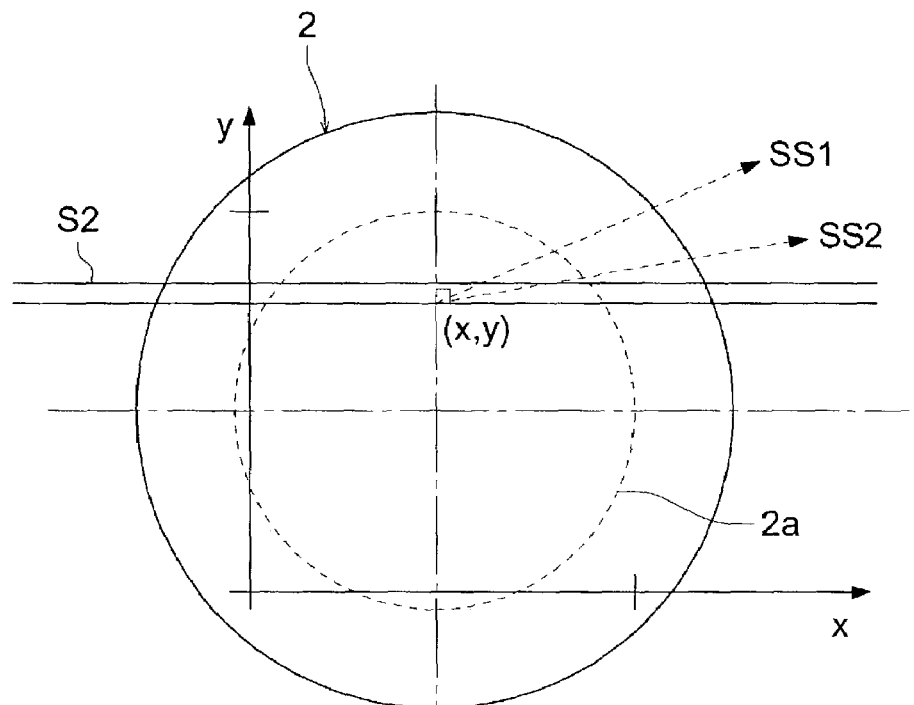
FIG. 8(A) to FIG. 8(C) are drawings explaining the method of determining the height of the surface of a base material.
Figure 8:
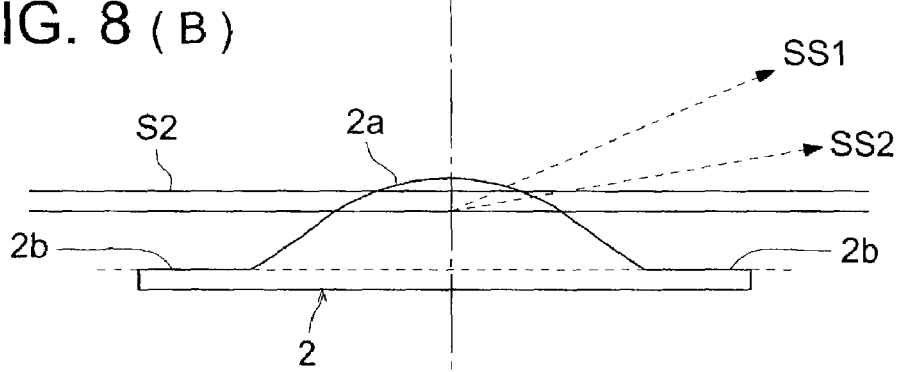
Figure 8:
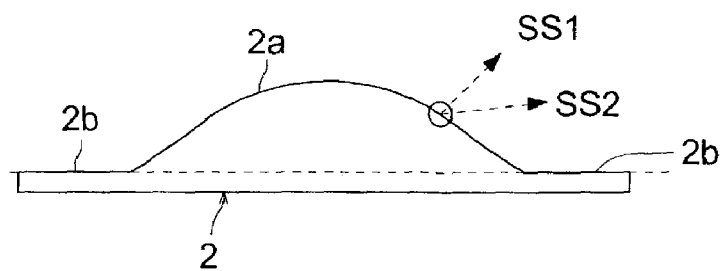

To state it concretely, if the second light beam S2 is transmitted through a point (x, y) on the curved surface portion 2a in an XY standard coordinate system with a certain height, as shown in FIG. 8(A) to FIG. 8(C), at this point (x, y), owing to the second light beam colliding with the curved surface of the curved surface portion 2a, the scattered light components SS1 and SS2 are generated, and the light intensity is reduced by these scattered light components. In this way, as shown in FIG. 8, the position (height) is measured and calculated on the basis of the second light intensity distribution detected by the second light receiving section 88.

Figure 9:
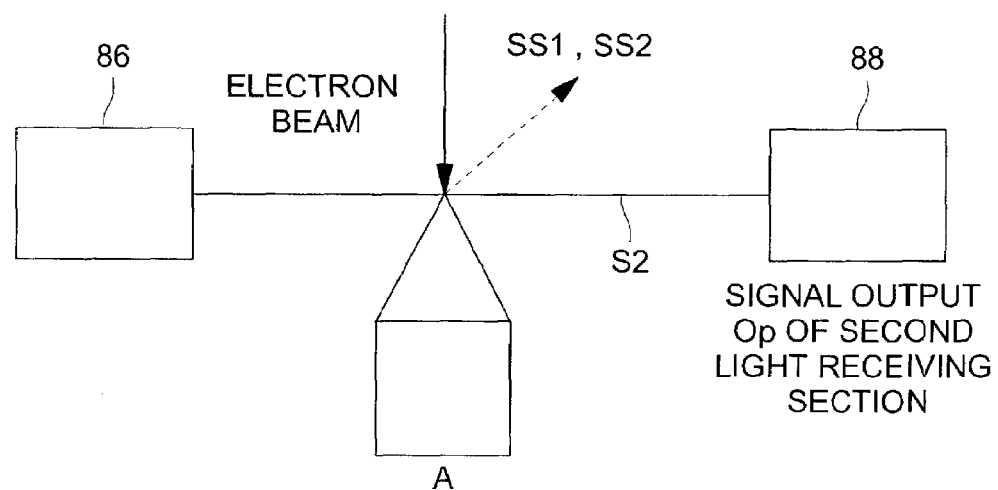
FIG. 9 is an explanatory drawing showing the relationship between light application and light reception in a measurement apparatus.
Figure 10:
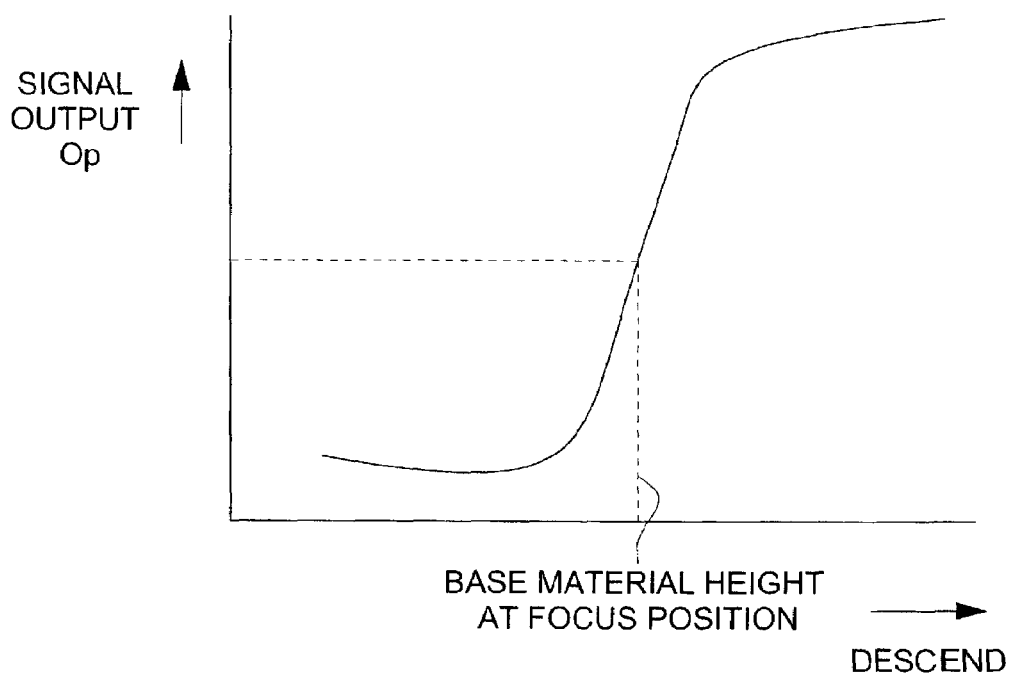
FIG. 10 is a characteristic graph showing the relationship between the signal output and the height of the base material.

At the time of this calculation, as shown in FIG. 9, because the signal output Op from the second light receiving section 88 has a correlation with the height of the base material as shown in the characteristic graph of FIG. 10, by storing a correlation relation table representing this characteristic, namely the correlation relation, in the memory 160 of the control circuit 100 or the like, the height position can be calculated on the basis of the signal output Op from the second light receiving section 88.

Further, with this height position of the base material taken as a pattern drawing position for example, the above-mentioned adjustment of the focus position of an electron beam is carried out, and pattern drawing is practiced.

(Summary of the Principle of Calculation of a Pattern Drawing Position)

Next, summary of the principle in pattern drawing in the pattern drawing apparatus using an electron beam 1, which is characteristic of this example, will be explained referring to FIGS. 11(A) to 11(C).

First, it is desirable that the base material 2 is material of the basic configuration for forming the metal molding die of the optical element such as the objective lens made of resin, and it has a structure comprising the flat portion 2b having approximately a shape of a flat plate in a cross-section and the curved surface portion 2a forming a curved surface projecting from this flat portion 2b. This curved surface of the curved surface portion 2a is not limited to a spherical surface, but any other free curved surface having variations in the height direction such as an aspherical surface may be appropriate.

As regards such a base material 2, before the base material 2 is previously placed on the XYZ stage 30, a plurality (for example three) of reference points P00, P01, and P02 on the base material 2 are determined and their positions are measured beforehand (the first measurement). By doing this, for example, X-axis is defined by the reference points P00 and P01, and Y-axis is defined by the reference points P00 and P02; the first standard coordinate system in a three-dimensional coordinate system can be calculated. Now, let Ho(x, y) be a height position in the first coordinate system (the first height position). By doing this, the calculation of the thickness distribution (coordinate data showing a three-dimensional shape of the base material) of the base material 2 can be carried out.

On the other hand, also after the base material 2 is placed on the XYZ stage 30, the same process is practiced. That is, as shown in FIG. 11(A), a plurality (for example three) of reference points on the base material 2 are determined and their positions are measured (the second measurement). By doing this, for example, X-axis is defined by the reference points P10 and P11, and Y-axis is defined by the reference points P10 and P12; the second standard coordinate in a three-dimensional coordinate system can be calculated.

Further, a coordinate transformation matrix etc. for transforming the first standard coordinate system into the second standard coordinate system are calculated by using these reference points P00, P01, P02, P10, P11, and P12, and by utilizing this transformation matrix, the height position Hp (x, y) in the second standard coordinate system (second height position) corresponding to the above-mentioned Ho(x, y) is calculated; this position is defined as an optimum focus position, that is, a position with which the focus position of the electron beam is to agree. By doing this, the correction of the above-mentioned thickness distribution of the base material 2 can be performed.

Further, the above-mentioned second measurement can be performed by using the measurement apparatus 80 as the first measuring means of the pattern drawing apparatus using an electron beam 1.

In addition, it is necessary that the first measurement is practiced at another place beforehand by means of another measurement apparatus. For such a measurement apparatus for measuring the reference points previously before the base material 2 is placed on the XYZ stage 30, a measurement apparatus 200 having the completely same structure as the above-mentioned measurement apparatus 80 (the second measuring means) can be employed.

In this case, the result of measurement by the measurement apparatus is inputted, for example, by the measurement information inputting unit 158 shown in FIG. 6, or the data are transmitted through a network (not shown in the drawing) connected to the control circuit 100, and stored in the memory 160 or the like. Of course, it can be considered a case where this measurement apparatus becomes unnecessary.

As described in the above, a pattern drawing position is calculated, the focus position of an electron beam is controlled, and pattern drawing is carried out.

Figure 11:
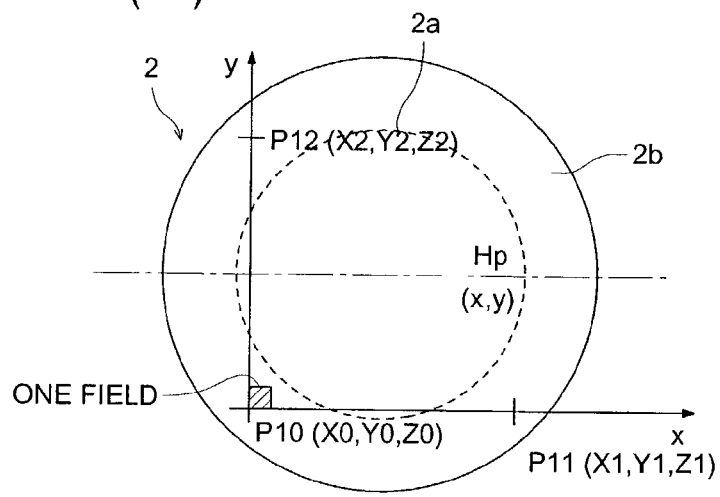
Figure 11:
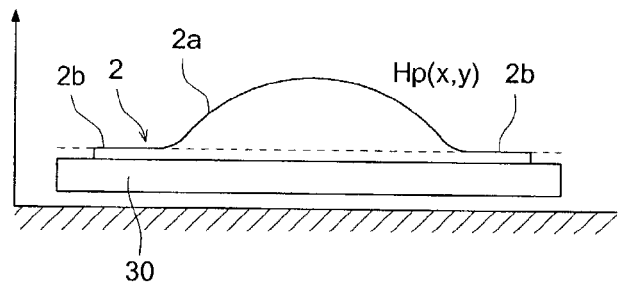
Figure 11:
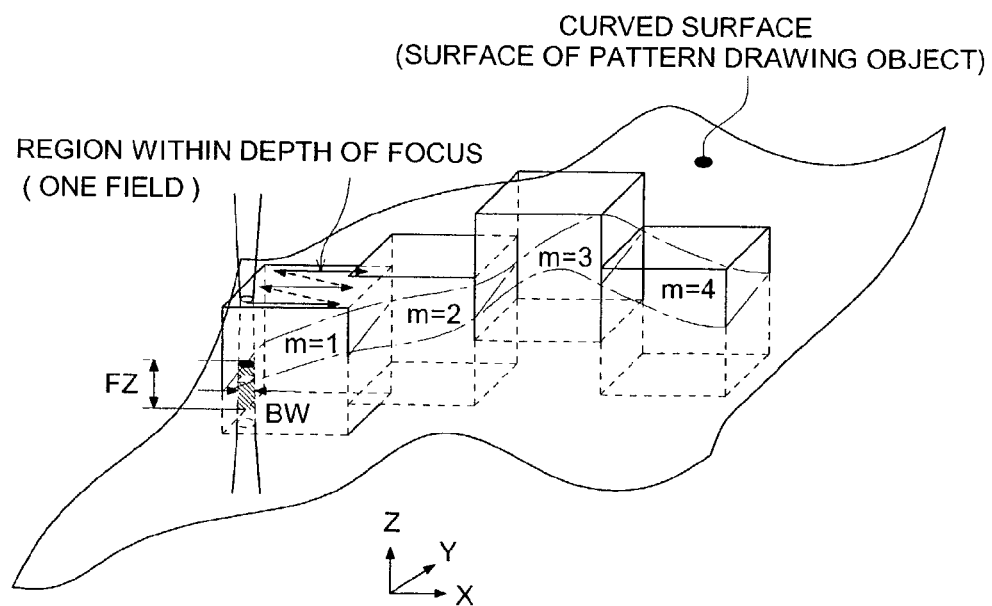

To state it concretely, as shown in FIG. 11(C), the focus position with a depth of focus FZ (beam waist BW) of an electron beam is adjusted and controlled to a pattern drawing position in one field (m=1) of a unit space in the three-dimensional standard coordinate system. (This control is carried out, as described in the foregoing, by any one of the adjustment of the electric current value in the electron lens 16 and the drive control of the XYZ stage 30 or the both of them.)

Figure 12:
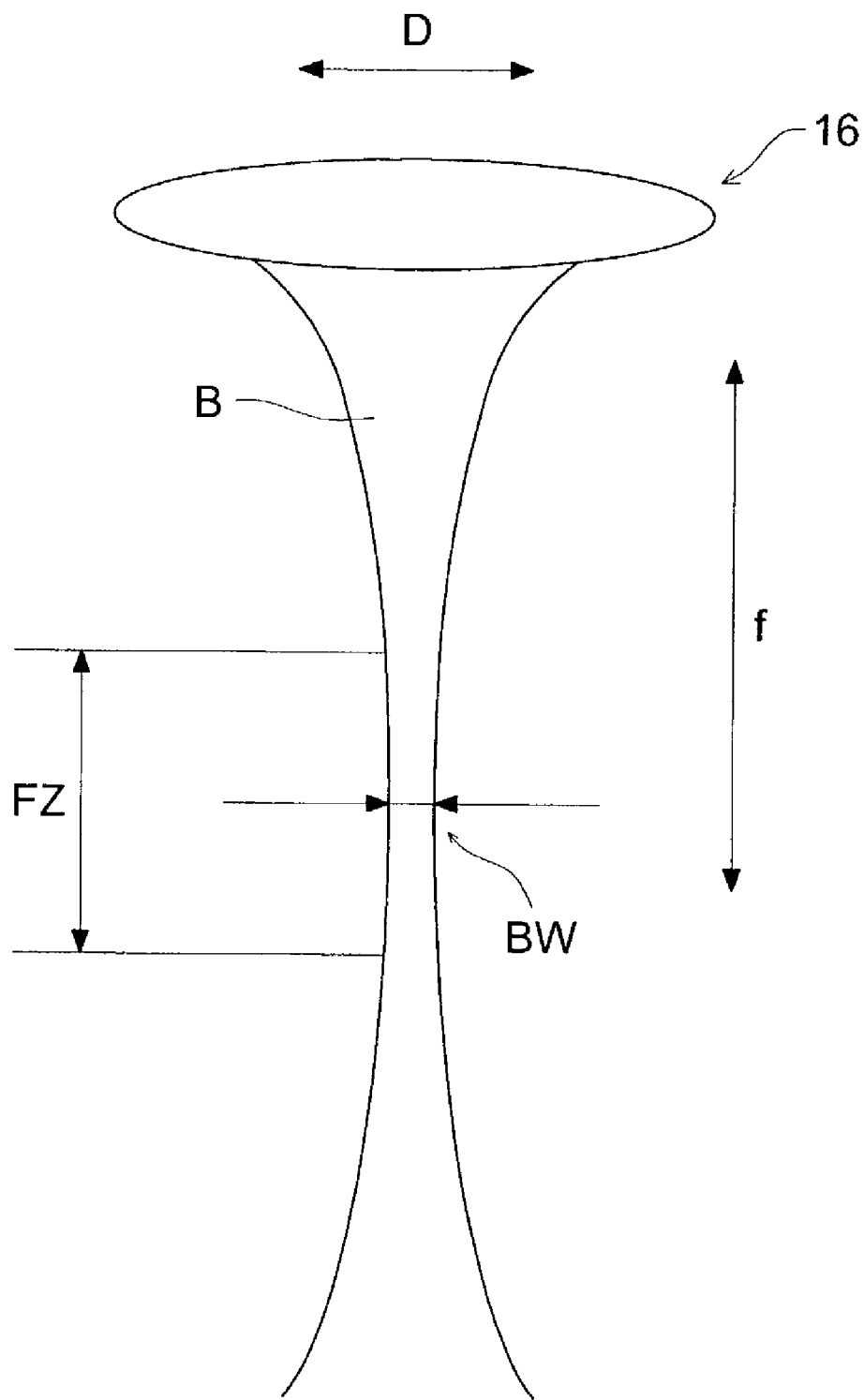
FIG. 12 is an explanatory drawing explaining the beam waist in a pattern drawing apparatus using an electron beam.

The electron beam has a long focal depth as shown in FIG. 12 so that the electron beam, which is stopped down by electron lens 16, forms beam waist BW of nearly constant thickness. Focal depth FZ means the length in the electron traveling direction of the waist beam of a constant thickness. The above-mentioned focus position means a central point of the waist beam in the electron traveling direction.

Besides, in the case of the electron beam B, as shown in FIG. 12, with D put as the width of the electron lens 16 and f put as the depth up to the beam waist BW (a position where the beam waist is thinnest), D/f is about 0.01; further for example, the resolving power is of the order 50 nm, and the depth of focus is of the order several tens $\mu$m.

Further, as shown in FIG. 11(C), for example, by scanning in the X direction sequentially while being shifted in the Y direction within one field, pattern drawing within one field is to be performed. Further, inside one field, if there is an area where pattern drawing is not done, for said area too, the focus position is shifted in the Z direction while it is being controlled in the above-mentioned way, and a pattern drawing process based on the same scanning is carried out.

Next, after pattern drawing within one field is done, also in other fields, for example, in a field of m=2, or in a field of m=3, in the same way as the above, pattern drawing is carried out in real time while the measurement and calculation of the pattern drawing position are being done. In this way, when the whole pattern drawing is finished for the pattern-drawn field on which the pattern is to be drawn, it can be said that the pattern drawing on the surface of the base material 2 has been finished.

Further, the processing program for practicing the above-mentioned various kinds of operation processing, measurement processing, and control processing is stored beforehand in the program memory 162 as a control program.

(Dose Distribution)

Figure 13:
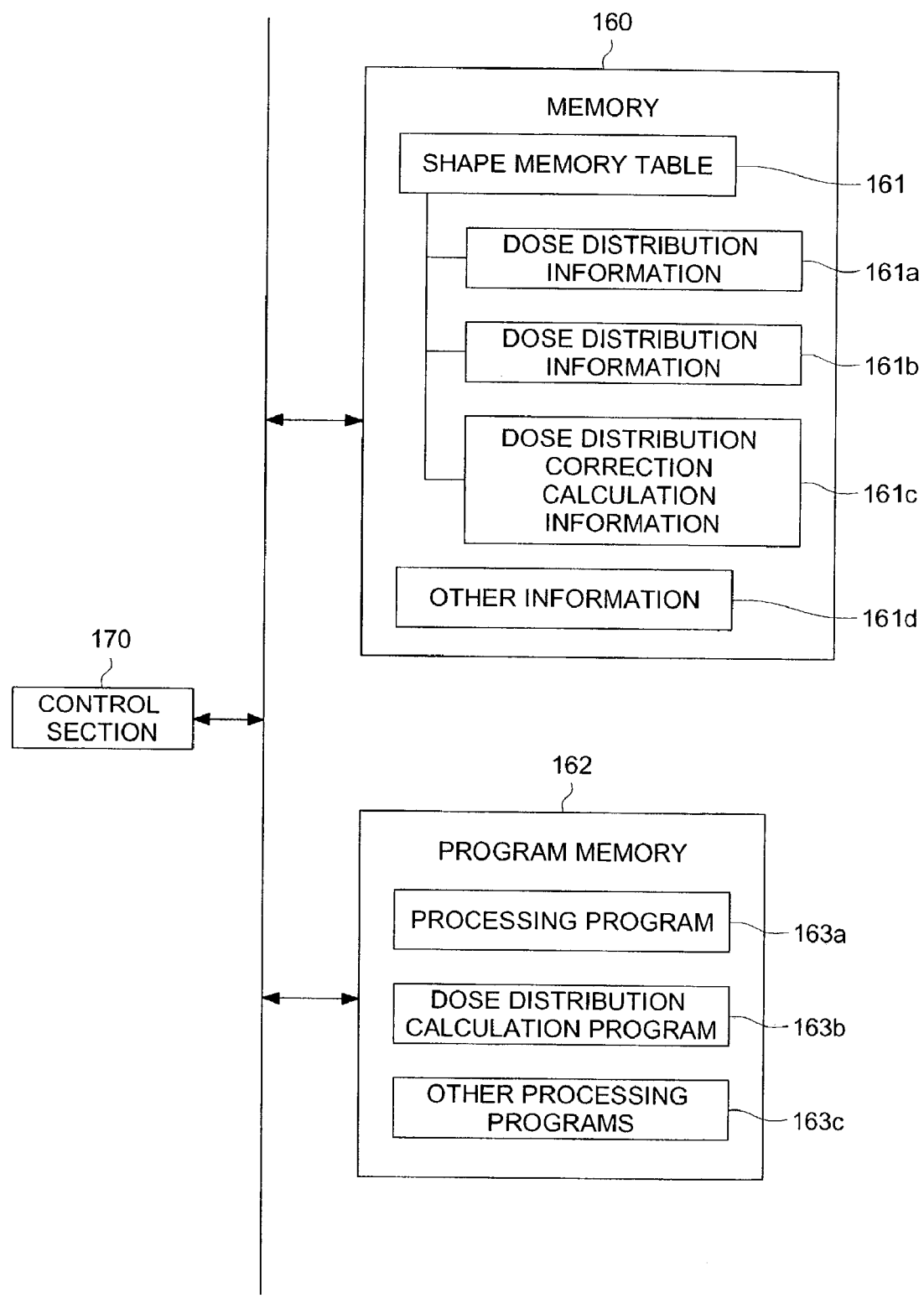
FIG. 13 is a functional block diagram showing the detail of a control system for practicing pattern drawing with a specified dose distribution in a pattern drawing apparatus using an electron beam.

In FIG. 13, it is disclosed the functional block diagram of a pattern drawing apparatus using an electron beam having a structure characteristic of this example of the embodiment. As shown in the drawing, the memory 160 of the pattern drawing apparatus using an electron beam 1 comprises a pattern memory table 161, and in this pattern memory table 161, dose distribution information 161a concerning the characteristic of the dose distribution etc. which defines beforehand the dose quantity distribution with respect to the scanning position in forming, for example, a diffractive grating one blaze unit after another in a tilted way on the curved surface portion 2a of the base material 2, dose distribution information 161b concerning the dose quantity at the pertinent concave or convex portion in forming concave and convex portions for reducing surface reflection for each of blaze units, dose distribution correcting operation information 161c concerning the correcting operation of a dose distribution, and other information 161d, etc. are memorized. In addition, the above-mentioned dose distribution correcting operation information 161c is a table or operation information to become the basis for calculating a dose distribution etc.

Further, in the program memory 162, a processing program 163a for practicing the processing of these (to state it more in detail, for example, a series of steps of procedure S101 to S118 in FIG. 24 to FIG. 26 to be described later, etc.), a dose distribution operation program 163b for calculating by operation the dose distribution characteristics etc. at a specified tilt angle on the curved surface portion 2a on the basis of the information such as the above-mentioned dose distribution information 161a, 161b, or the dose distribution correcting operation information 161c, another processing program 163c, etc. are memorized.

In the control system having such a structure as described in the above, dose distribution information is stored beforehand in the pattern memory table 161 of the memory 160 for example, and on the basis of the processing program 163a, a pertinent portion of the dose distribution information is extracted, to practice various kinds of pattern drawing by using the dose distribution information.

In another way, the control unit 170 may practice a control using a method in which a specified pattern drawing algorithm is practiced by using the processing program 163a to come to the routine for calculating a dose quantity, then, the dose distribution operation program 163b is practiced, and after corresponding dose distribution characteristic information is calculated as referring to a table which stores basic information to some extent for calculating dose distributions in accordance with the tilt angle, namely, the two kinds of dose distribution information 161a and 161b, the dose distribution correcting operation information 161c, etc., this calculated dose distribution characteristic information is stored in a specified temporary memory area of the above-mentioned memory 160, and dose quantities are calculated by referring to the dose distribution characteristic information, to carry out the pattern drawing.

(The Concrete Structure of the Control System)

Figure 14:
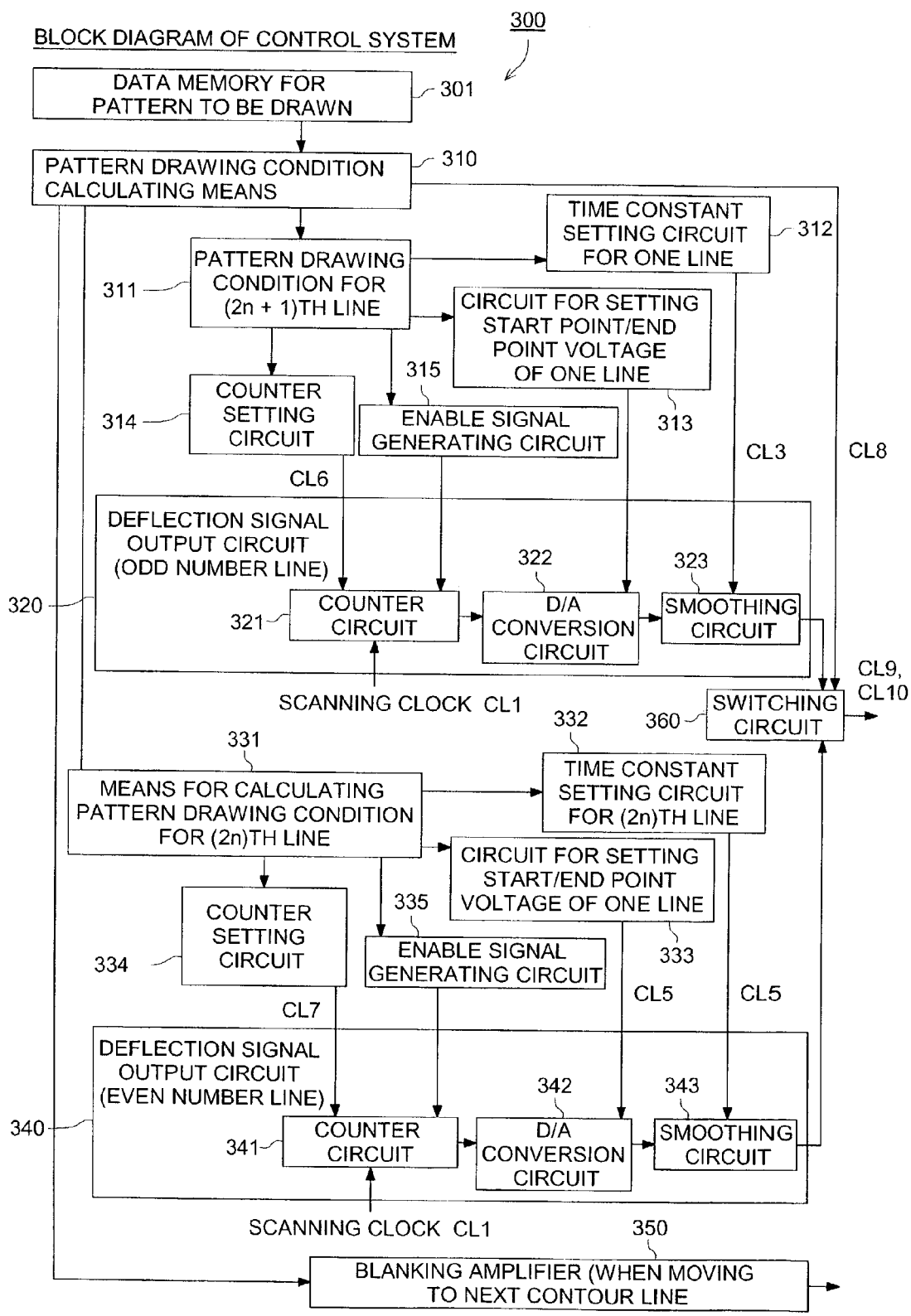
FIG. 14 is a more detailed functional block diagram showing the structure of a control system of a pattern drawing apparatus using an electron beam.

In the following, the concrete structure of the control system for practicing various kinds of processes in the case where the above-mentioned circular pattern is approximated by a regular polygon to be drawn by straight-line scans will be explained with reference to FIG. 14. In FIG. 14, the detailed structure of the control system of a pattern drawing apparatus using an electron beam of this example of the embodiment is disclosed.

As shown in FIG. 14, the control system 300 of the pattern drawing apparatus using an electron beam has a structure comprising a drawing pattern data memory 301 as a drawing pattern memorizing means for memorizing various kinds of data, for example, which are necessary, in drawing a circular pattern, for approximating it by a regular polygon (or an irregular polygon) (corresponding to the radius of circles) (for example, as regards a circle having a radius of k mm, the information corresponding to the circle such as the number of divisions n based on the polygon, the coordinate information of the positions of the sides and the positions of the vertices as well as the multiple value of the clock number, and further, the position in the Z direction), further, various kinds of data which are necessary, in drawing various kinds of curved lines, not to be limited to a circle, for approximating them by sets of straight lines, and the data concerning various kinds of patterns to be drawn (a rectangle, a triangle, a polygon, a vertical line, a horizontal line, an oblique line, a circular plate, a circumference, whole sides of a triangle, an arc, a sector, an ellipse, etc.).

Further, the control system 300 has a structure comprising a pattern drawing condition calculating means 310 for carrying out the calculation of the pattern drawing conditions on the basis of the drawing pattern data memorized in the above-mentioned drawing pattern data memory 301, a (2n+1)th line drawing condition calculating means 311 for carrying out the calculation of the pattern drawing conditions of the (2n+1)th line, the odd-number line, from the above-mentioned pattern drawing condition calculating means 310 (in the case where n=0, 1, 2, - - - , the number is (2n+1), but in the case where n=1, 2, 3, - - - , the number may be also (2n−1)), a time constant setting circuit 312 for setting the time constant of one line on the basis of the (2n+1)th line drawing condition calculating means 311, a start/end point voltage setting circuit 313 for setting the voltage at the start point and end point of one line on the basis of the (2n+1)th line drawing condition calculating means 311, a counter number setting circuit 314 for setting a counter number on the basis of the (2n+1)th line drawing condition calculating means 311, an enable signal generating circuit 315 for generating an enable signal on the basis of the (2n+1)th line drawing condition calculating means 311, and a deflection signal outputting circuit 320 for outputting a deflection signal of an odd-number line.

Further, the control system 300 has a structure comprising a (2n)th line drawing condition calculating means 331 for carrying out the calculation of the pattern drawing conditions of the (2n)th line, the even-number line, from the above-mentioned pattern drawing condition calculating means 310, a time constant setting circuit 332 for setting the time constant of one line on the basis of the (2n) line drawing condition calculating means 331, a start/end point voltage setting circuit 333 for setting the voltage at the start point and end point of one line on the basis of the (2n)th line drawing condition calculating means 331, a counter number setting circuit 334 for setting a counter number on the basis of the (2n)th line drawing condition calculating means 331, an enable signal generating circuit 335 for generating an enable signal on the basis of the (2n)th line drawing condition calculating means 331, a deflection signal outputting circuit 340 for outputting a deflection signal of the even-number line, a blanking amplifier 350 for carrying out blanking at a timing when pattern drawing moves to the next contour line on the basis of the (2n)th line drawing condition calculating means 331, and a switching circuit 360 for switching the processing steps between an odd-number line and an even-number line on the basis of the pattern drawing conditions in the pattern drawing condition calculating means 310 and the information from the deflection signal outputting circuit 320 of an odd-number line and from the deflection signal outputting circuit 340 of an even-number line.

The deflection signal outputting circuit 320 of an odd-number line has a structure comprising a counter circuit 321 as a number counting means for practicing count processing on the basis of a scanning clock CL1, an odd-number line count signal CL6 from the counter number setting circuit 314, and an enable signal from the enable signal generating circuit 315, a D/A conversion circuit 322 for carrying out D/A conversion on the basis of a count timing signal and an odd-number line drawing condition signal CL3 in the start/end point voltage setting circuit 313, and a smoothing circuit 323 for carrying out processing to smooth an analogue signal converted in the D/A conversion circuit 322 (processing such as eliminating higher frequency components of a deflection signal).

The deflection signal outputting circuit 340 for an even-number line has a structure comprising a counter circuit 341 as a number counting means for practicing a counting process on the basis of a scanning clock CL1, an even-number line count signal CL7 from the counter number setting circuit 334, and an enable signal from the enable signal generating circuit 335, a D/A conversion circuit 342 for carrying out D/A conversion on the basis of a count timing signal and an even-number line drawing condition signal CL5 in the start/end point voltage setting circuit 333, and a smoothing circuit 343 for carrying out processing to smooth an analogue signal converted in the D/A conversion circuit 342.

Besides, it is employed such a structure that every part composing the control system 300 can be controlled by the control section 170 (control means) such as the CPU shown in FIG. 3. Further, also it is possible that this control system makes up each of the control system for X-deflection and the control-system for Y-deflection.

Furthermore, "an operation means" can be made up of this control system 300 in this example of the embodiment comprising the drawing pattern data memory 301 and the pattern drawing condition calculating means 310. This "operation means" has a function to calculate the respective positions of at least two points equivalent to the distance corresponding to the time of an integral multiple of the minimum time of resolving power of the D/A converter on a scan line to be scanned. In this case, the "control means" in the control section 170 practice such a control as to make an approximately straight-line scanning by the above-mentioned electron beam between the two positions calculated by the above-mentioned operation means. Further, in the same way, "an operation means" in another example of the embodiment of this invention, has a function to calculate the vertex positions of a polygon with a side length of a distance corresponding to an integral multiple of the minimum time of the resolving power of the D/A converter on a scan line to be scanned approximately circularly. Moreover, in the same way, the control means carries out a control to make an approximately straight-line scanning by the above-mentioned electron beam between the positions calculated by the operation means.

The control system 300 having a structure as mentioned in the above functions generally in the following way. That is, when the pattern drawing condition calculating means 310 obtains the information which is necessary for a scanning (pattern drawing) approximated by a straight line from the drawing pattern data memory 301, it practices calculation processing of the specified pattern drawing conditions, for example, in the case where a circular pattern is approximated by the sides of a regular polygon, the information concerning the first side among the above-mentioned sides of a polygon, that is, the odd-number line, is transmitted to the (2n+1)th line drawing condition calculating means 311, and the information concerning the next side, that is, the even-number line, is transmitted to the (2n)th line drawing condition calculating means 331.

Through this, for example, the (2n+1)th line drawing condition calculating means 311 generates the pattern drawing conditions concerning odd-number lines, and on the basis of the scanning clock CL1 and a generated odd-number line drawing condition generation signal CL2, it outputs an odd-number line deflection signal CL9 from the deflection signal outputting circuit 320.

On the other hand, for example, the (2n)th line drawing condition calculating means 331 generates the pattern drawing conditions concerning even-number lines, and on the basis of the scanning clock CL1 and a generated even-number line drawing condition generation signal CL4, it outputs an even-number line deflection signal CL10 from the deflection signal outputting circuit 340.

As regards these odd-number line deflection signal CL9 and even-number line deflection signal CL10, their outputs are switched alternately by the switching circuit 360 under the pattern drawing condition calculating means 310. Hence, as regards a certain circle, when each of the sides of a polygon approximating the circle is calculated, the sides of the polygon are alternately drawn (scanned) as straight lines in such a way that when one of the sides, an odd-number side, is drawn, the next side, an even-number side, is drawn, and then, the next side, an odd-number side, is drawn.

Then, when the pattern drawing for a certain circle is finished, the pattern drawing condition calculating means 310 transmits a message to that effect to the blanking amplifier 350, and carries out processing to urge the pattern drawing of another circle.

Figure 15:
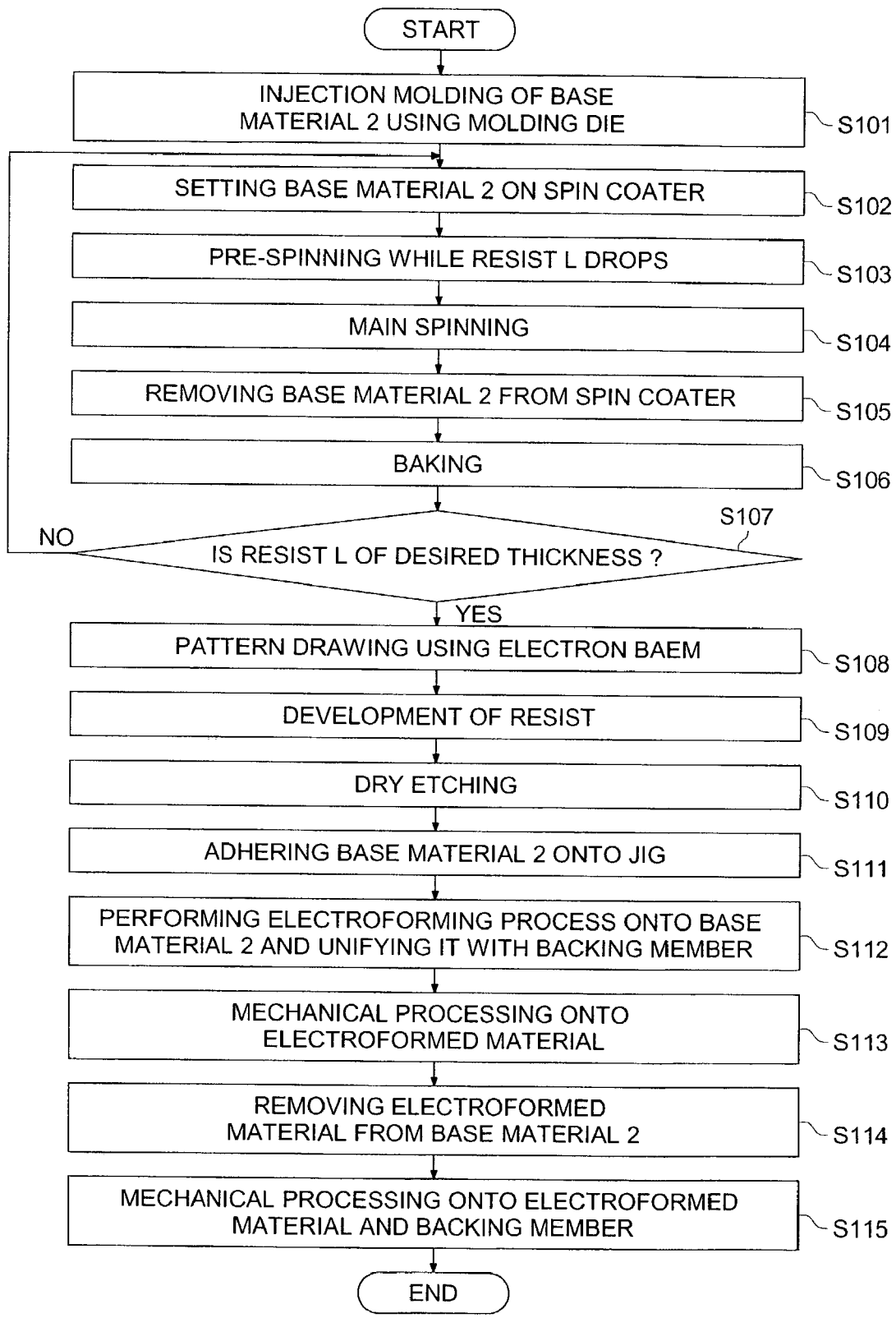
FIG. 15 is a flow chart showing the manufacturing method of the metal molding die of the present embodiment.
Figure 16:
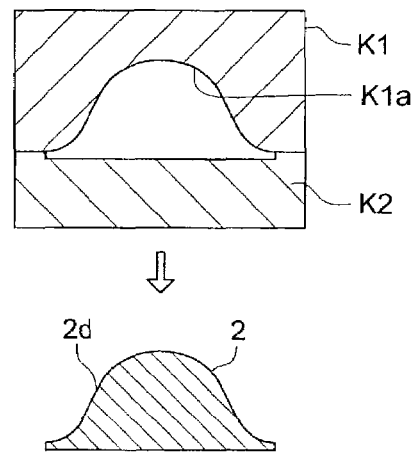
FIG. 16 is a cross section showing the basic configuration (base material) which is processed in the main steps shown in FIG. 15.
Figure 16:
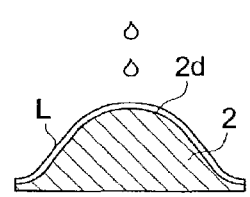
Figure 16:
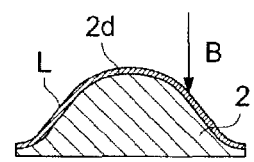
Figure 16:
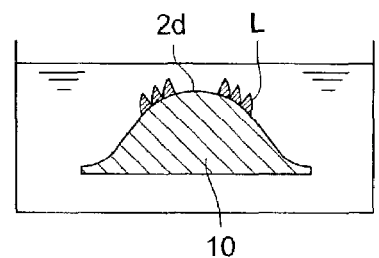
Figure 16:
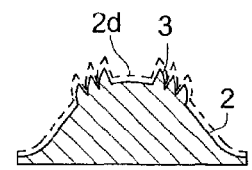

Next, to be explained will be the steps for forming the basic configuration using the above-mentioned pattern drawing by a beam scanning, and for forming the metal molding die for the optical element from the basic configuration. FIG. 15 is a flow chart showing the manufacturing method of the metal molding die of the present embodiment. FIG. 16 is a cross section of the base material to be processed in the main steps shown in FIG. 15.

Firstly, in step S101 in FIG. 15, after the resin material is heated and melted, it is injected into a space of molding dies K1 and K2, to form injection molded base material 2. On this occasion, a ring-shaped zone is not formed on transferring surface K1a of molding die K1, but transferring surface K1a is formed to be aspherical corresponding to the optical surface of the optical element, and accordingly, the aspherical surface is transferred precisely on the base optical surface (that is, anti-flat surface 2d) of injection-molded base material 2. Alternatively, base material 2 can be manufactured from silicone by a cutting process.

Next, in step S102, base material 2 is set on a spin coater not-illustrated, after pre-spinning is effected while resist L is dropped on base material 2 in step S103, a main spinning, rotating higher than pre-spinning, is effected to coat base material 2 with resist L in step S104 (See FIG. 16(B)). The reason for using the pre-spinning and main spinning is to coat base optical surface 2d of the base materials, which has a complicated surface such as the aspherical surface, with resist L of the uniformed thickness. Alternatively, it is possible to coat base optical surface 2d of the base material, by spraying resist L onto base material 2.

After that, base material 2 is removed from the spin coater in step S105, a baking process is performed at an ambient temperature of 180° C. for 20 minutes to harden and stabilize the coating made of resist L in step S106. When a sufficient coating thickness cannot be produced by one coating process of resist L, steps S102 to S106 are repeated until the coatings of resist L are stacked to a sufficient thickness (step S107), and in step S108, by employing electron beam B radiated from a pattern drawing apparatus not-illustrated using an electron beam, pattern drawing process using an electron beam is effected on resist L on base optical surface 2d of base material 2 (See FIG. 16(C)). In this case, the pattern drawing is performed by the above-mentioned step and repeat method, and as mentioned in relationship to FIG. 2, the pattern-drawn field (field) using an electron beam is divided at the connecting portion of the slope portion and the side wall portion so that the drawback explained referring to FIG. 1 can be dissolved.

Figure 19:
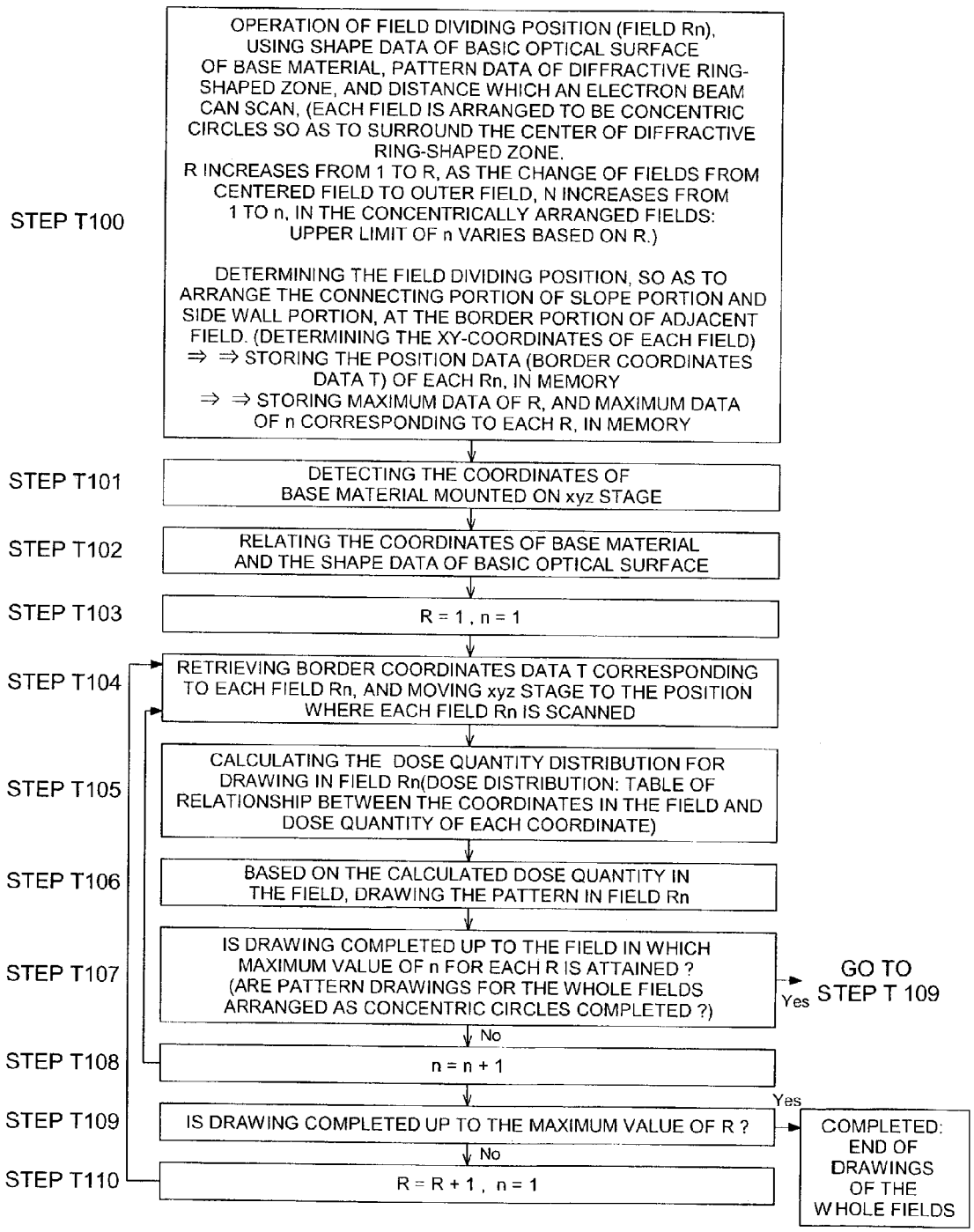
FIG. 19 is a concrete flow chart showing the processes of the present invention for merging the pattern-drawn fields.

The specific processes to connect each pattern-drawn field (hereinafter referred to as a field) of the present invention will be explained referring to FIG. 19. A fundamental program for performing these processes is performed by processing program 163a in FIG. 13.

Concerning a pattern drawing process, in step T100, the coordinates, corresponding to the plurality of the fields obtained by dividing the base optical surface on the base material, are operated and determined, using shape data about base optical surface of the base material (from dose distribution correcting operation information 161c), ring-shaped diffractive zone pattern data (from dose distribution information 161a), and a distance which an electron beam can scan (from other information 161d), all of which are stored in a memory means (memory 160) in FIG. 13.

Border coordinate datum T (the coordinates data of the area showing the border around the field, for example, xy-coordinates on XYZ stage), outputted corresponding to each determined datum, is stored in memory 160 (stored as one of other information 161d).

The number, represented by variables R and n, is assigned to each field as shown in FIG. 18, then, field Rn is stored in memory 160 to correspond to border coordinate datum T, respectively. Specifically, after assigning number 1 to R from the central portion of the ring-shaped diffractive zone to its radius directional portions (controlled by variable R: the outermost field corresponds to the maximum value of R), and assigning number 1 to n along the concentric circles of the ring-shaped diffractive zone (controlled by variable n: the maximum value of n changes based on R, or the field number counted from the center), the control is effected so that the drawings are performed successively based on the assigned numbers.

The maximum values of above-mentioned valuables R and n are determined simultaneously, based on how the divided fields exist on the base material, when the field is divided in step T100, and the maximum values are stored in memory 161 (as other information 161d) until the drawings on all fields are completed, and will be properly referred to in the following steps.

For the above-mentioned operation, the slope portion and side wall portion on the pattern of the diffractive ring-shape zone are found by the dose quantity distribution (pattern data of the ring-shaped diffractive zone) which corresponds to the pattern (shape) of the ring-shaped diffractive zone of the required optical element. Further, when the base optical surface on the base material is divided into the plurality of fields, the division of the field is performed by calculation so that the borders of each field (for example, the first pattern-drawn field and second pattern-drawn field in FIG. 18), which are adjacent to each other in the radius direction of the ring-shaped diffractive zone, may be positioned at the connecting portion of the slope portion and side wall portion of the pattern. Still further, coordinate datum T, corresponding to the obtained each field, is determined, so as to relate the coordinates of the shape data of the base optical surface of the base material. Concerning the method of the calculation for dividing the field, a method can be applied in which, initially, calculated is the largest possible number of ring-shaped diffractive zones which can exist in the distance where the electron beam can scan, next, the field width in the radius direction of the ring-shaped diffractive zone is determined by the calculated number of the ring-shaped diffractive zones, and subsequently, the coordinates corresponding to the each field are determined by the field width. However, the method of the operation is not limited to this. Further, it is also possible to correct the operation, based on the shape of the base optical surface of the base material.

For example, concerning the pattern-drawn field of R=1 and that of R=2 (or the pattern-drawn fields of R=2, and R=3), both of which are adjacent to each other in the radius direction of the ring-shaped diffractive zone, border coordinates datum T is determined by the above-mentioned operation. Further, the field is divided into a plurality of pattern-drawn fields which are aligned in the concentric circle of the ring-shaped diffractive zone (for example, the division into the successive pattern-drawn fields of n=1, 2, 3, - - -, in the pattern-drawn field of R=2), and the result is applied to border coordinate datum T.

Up to this point, the exact plurality of fields are determined, which are divided on the base optical surface of the base material for the pattern drawing, and thereby, each field is obtained as coordinate data, which are stored in memory 160.

In step T101, when the base material is mounted on XYZ stage 30 of the pattern drawing apparatus using an electron beam, the position of the base material is detected, and stored in memory 161 as coordinate data (for example, as other information 161d).

The coordinate data, corresponding to the position of the base material, which are stored in memory 161 in step T101, are paired with the shape data of the base optical surface in step T102.

After that, the pattern drawings are successively performed by the electron beam on each field, based on the above-mentioned coordinate data. As shown in FIG. 18, R of pattern-drawn field Rn changes from 1 to the maximum value of R, as the change from the center portion to the radius directional portion, while n changes from 1 to the maximum value of n, along the concentric circle of the ring-shaped diffractive zone, and variables R and n are changed successively, for every change of the field caused by the relative shift of the base material and the beam radiating source.

In step T103, variables R and n are set to initial values (R=1, n=1) respectively so that field Rn (central field in FIG. 18) on which the pattern is initially drawn is designated.

In step T104, border coordinate datum T corresponding to field Rn is retrieved from memory 161, and XYZ stage 30 on which the base material is mounted, is shifted relatively to the beam radiating source, to perform the pattern drawing on field Rn by datum T.

In step T105, the dose distribution in field Rn is calculated. The dose distribution for each coordinate in field Rn are calculated by information such as processing program 163a, dose distribution operating program 163b, dose distribution information 161a and 161b, dose distribution correction operating information 161c, and the like, after which the dose distribution data are temporarily stored in memory 161a as a table of the dose quantity corresponding to each coordinate in field Rn.

In step T106, based on the dose distribution in field Rn obtained by the above-mentioned steps, the pattern drawing is performed in field Rn by the pattern drawing apparatus using an electron beam. Concerning an actual drawing line in the field, scanning by the electron beam is effected by an approximate method shown in FIG. 14.

In step T107, it is determined whether the pattern drawings in the fields arranged in a concentric circle are or are not completed, if they are not completed, the process goes to step T108, to increase the valuable from n to n+1, and returns to step T104. Then, the relative shift of the base material and beam radiating source, and the pattern drawings in each field are repeated, until the pattern drawings in the fields which are arranged in each concentric circle, are perfectly completed.

Step T109 determines whether the pattern drawings in the fields arranged in the radius direction of the ring-shaped diffractive zone are or are not completed, if they are not completed, the process goes to step T110, to increase the valuable from R to R+1, and returns to step T104. Then, the relative shift of the base material and the beam radiating source, and the pattern drawing in each field, are repeated, until the pattern drawings in the fields are perfectly completed. That is, in FIG. 18, the field is changed from first pattern-drawn field A to second pattern-drawn field B, which is adjacent to the outer side of area A, to perform the drawing.

The step and repeat method of the present invention is realized as mentioned above. In the above-mentioned process, the dose distribution of each field Rn are calculated in step T105, for every relative shift of the base material in step T 104, by which processing can be effected without excessively using capacity of memory 161, however the invention is not limited to this. It is also possible to store the dose distribution corresponding to whole field Rn, when the field is divided, and to retrieve the dose distribution individually, when the pattern drawing is performed by an electron beam.

After the process of the pattern drawing using an electron beam, the developing process and rinse process are performed for base material 2 in step S109 (See FIG. 16(D)), to remove any excess resist, and thereby, resist L, shaped in the ring, is produced. Since the longer the radiating time of electron beam B to an identical point, the more is the removed quantity of resist L, resist L can be produced with a braze-shaped ring-shaped diffractive zone, by adjusting the dose quantity of the electron beam based on a position.

Further, in step S110, through a dry-etching by a plasma-shower, the surface of base optical surface 2d of base material 2 is carved to form blaze-shaped ring-shaped diffractive zone 3 (See FIG. 16(E), the drawing is exaggerated for clarity).

Still further, in step S111, base material 2 is adhered onto a cylindrical jig (not illustrated). After that, a backing member is attached onto base material 2, and in step S112, the base member whose surface has been active-processed, is immersed in a bath of nickel sulfamate, the electroforming is allowed to grow an electroforming member. Still further, the electroforming member is cut in step S113, after which base material 2 and the electroforming member are removed from the dies. The removed electroforming member is processed by tools in step S115, and is assembled in a molding apparatus as the metal molding die for molding the optical element, and is used for the molding of the optical element.

Figure 17:
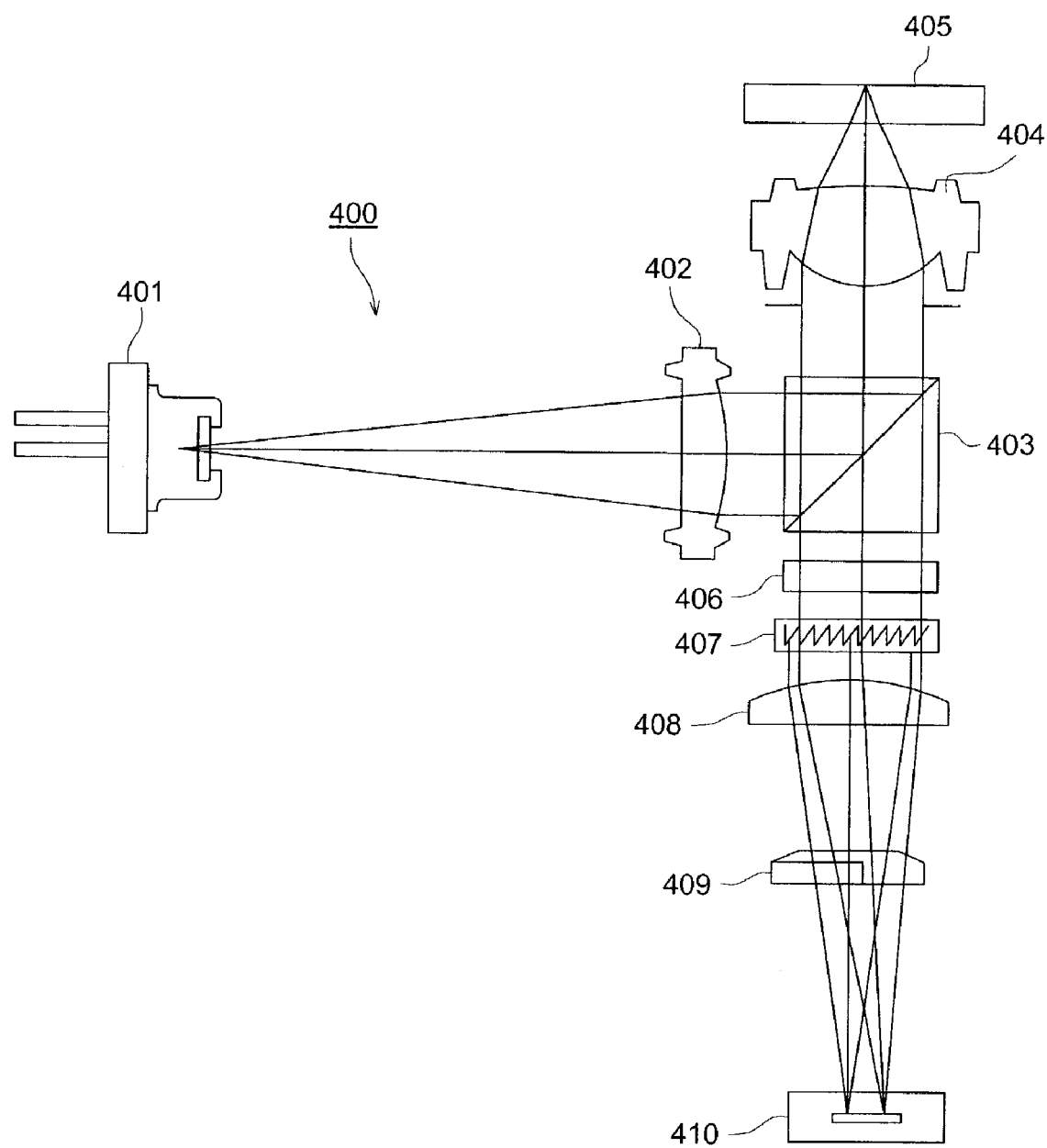
FIG. 17 is an explanatory drawing showing the outline of an optical pickup device.

FIG. 17 is an explanatory drawing showing the outline of an optical pickup device including the objective lens as an example of the optical element, which is formed by the method of pattern drawing by the scanning beam of the present embodiment. In FIG. 17, optical pickup device 400 features semiconductor laser 401, collimator lens 402, split prism 403, objective lens 404, magneto-optical disk 405 (magneto-optical recording media) such as DVD and CD, halfwave plate 406, polarized light splitting element 407, convergent lens 408, cylindrical lens 409 and split light detector 410.

In the optical pickup device 400 having a structure as described in the above, a laser beam from the semiconductor laser 401 is made a parallel beam by the collimator lens 402, is reflected by the splitting prism 403 towards the objective lens 404, is converged by the objective lens 404 to the diffraction limit, and is applied to the magneto-optical disk 405 (magneto-optical recording medium).

The reflected laser beam from the magneto-optical disk 405 enters the objective lens 404, is again made a parallel beam, is transmitted through the splitting prism 403, is further transmitted through the half-wave plate 406 to rotate its polarization orientation by 45 degrees, and then, enters the polarized light splitting element 407, by which it is split into two bundles of rays which are composed of P polarized light and S polarized light and have optical paths close to each other respectively. The above-mentioned two bundles of rays composed of P polarized light and S polarized light respectively are converged by the convergent lens 408 and the cylindrical lens 409, to form their respective spots in the split light receiving areas (light receiving elements) of the split light detector 410.

Next, another embodiment of the present invention will be explained.

When a pattern such as a ring-shaped diffractive zone of an optical element is drawn, scanning fields are arranged so that the optical axis is encircled by the scanning fields, because a ring-shaped diffractive zone are circumferential concentric grooves on the optical axis. According to the conventional method, "k" pieces of the scanning fields are arranged around the optical axis, and after the pattern drawing is performed on the first scanning field, the next pattern drawing is performed clockwise on the second scanning field, and continues in the same way, when it is completed on the $k^{th}$ scanning field, the $k^{th}$ formed pattern does not contact the pattern on the 1st scanning field, which is commonly known. The reason for this is that an electronic beam has such characteristics that its radiating direction deviates according to changes of the environment such as temperature, magnetic field, and vibration, and therefore, when there is a passage of time between the first and $k^{th}$ scanning fields, deviation of the pattern tend to occur due to changes in the environment.

In the present invention, above problems are solved by the following structures.

A first method of drawing a pattern by a beam of the present invention, is one in which:

after the pattern is drawn on a pattern-drawn field on a base material as an object of pattern drawing, using a beam from a beam radiating device, both the base material as an object of pattern drawing and the beam radiating device are shifted relatively, further, the pattern is drawn by the beam on another pattern-drawn field that is different from the above-mentioned pattern-drawn field on the base material as the object of the pattern-drawn field, which is characterized by:

when the patterns are drawn on a plurality of the pattern-drawn fields which are arranged continuously around a predetermined central point and are closed, the pattern is drawn on the pattern-drawn field which is adjacent to all of the pattern-drawn fields so that a reciprocal order is restricted within a predetermined number.

According to the method of drawing the pattern of the present invention, pattern drawing is performed on the pattern-drawn fields adjacent to each pattern-drawn field, so that the reciprocal order is restricted within the predetermined number. In this case, the predetermined number means numerical value p ("p" being an integer) determined as a limit in which the deviation of the reciprocal patterns does not substantially affect, when the pattern-drawn fields are adjacent to each other. When a drawing order ($1^{st}$, $2^{nd}$, $3^{rd}$, - - -, $n^{th}$, - - -, $k^{th}$) on each pattern-drawn field of "k" pieces arranged in concentric circles, is determined, the drawing order for the pattern-drawn field adjacent to the $n^{th}$ pattern-drawn field is determined so that the drawing order is either one of orders $(n+1)^{th}$ to $(n+p)^{th}$. The above-mentioned numerical value "p" can be used as a predetermined value that is within the safety limits so that any deviations which occur on the drawn patterns do not affect each other, or by providing a detecting means that detects temperature, magnetic field, and the like, the above-mentioned numerical value "p" can be varied, based on values which are detected by the detecting means.

A second method of drawing a pattern by a beam of the present invention, is one in which:

after the pattern is drawn on a pattern-drawn field on a base material as an object of pattern drawing, using a beam from a beam radiating device, both the base material as an object of pattern drawing and the beam radiating device are shifted relatively, further, the pattern is drawn by the beam on another pattern-drawn field that is different from the above-mentioned pattern-drawn field on the base material as the object of the pattern-drawn field, which is characterized by:

when the pattern is drawn on a plurality of the pattern-drawn fields which are arranged continuously around a predetermined central point and are closed, the pattern is drawn on the pattern-drawn field adjacent to all of the pattern-drawn fields, within a predetermined time.

According to the method of drawing pattern of the present invention, the reciprocal pattern drawings are performed on the pattern-drawn fields adjacent to each pattern-drawn field, within a predetermined time. In this case, predetermined time means time "q" determined as a time limit in which any deviations of the reciprocal patterns do not substantially affect, when the pattern-drawn fields are adjacent to each other. When a drawing order ($1^{st}$, $2^{nd}$, $3^{rd}$, - - -, $n^{th}$, - - -, $k^{th}$) on each pattern-drawn field of "k" pieces arranged in concentric circles, is determined, the drawing order for the pattern-drawn field adjacent to the $n^{th}$ pattern-drawn field is determined so that pattern drawing is performed within time "q" from the drawing on the $n^{th}$ pattern-drawn field. The above-mentioned numerical value "q" can be used as the predetermined value that is within a safety limit in which any deviations which occur on the drawn patterns do not affect each other, or by providing a means that detects temperature, magnetic field and the like, the above-mentioned numerical value "q" can be varied, based on values which are detected by the detecting means.

A third method of drawing a pattern by a beam of the present invention, is one in which:

after the pattern is drawn on a pattern-drawn field on a base material as an object of pattern drawing, using a beam from a beam radiating device, both the base material as an object of pattern drawing and the beam radiating device are shifted relatively, further, the pattern is drawn by the beam on another pattern-drawn field that is different from the above-mentioned pattern-drawn field on the base material as the object of the pattern-drawn field, which is characterized by:

when the pattern is drawn on a plurality of the pattern-drawn fields which are arranged continuously around a predetermined central point and are composed of closed k (being integers, not less than three) pieces of the pattern-drawn fields, the pattern is drawn on each pattern-drawn field in turn so that the $k^{th}$ pattern-drawn field is not adjacent to the first pattern-drawn field.

Figure 20:
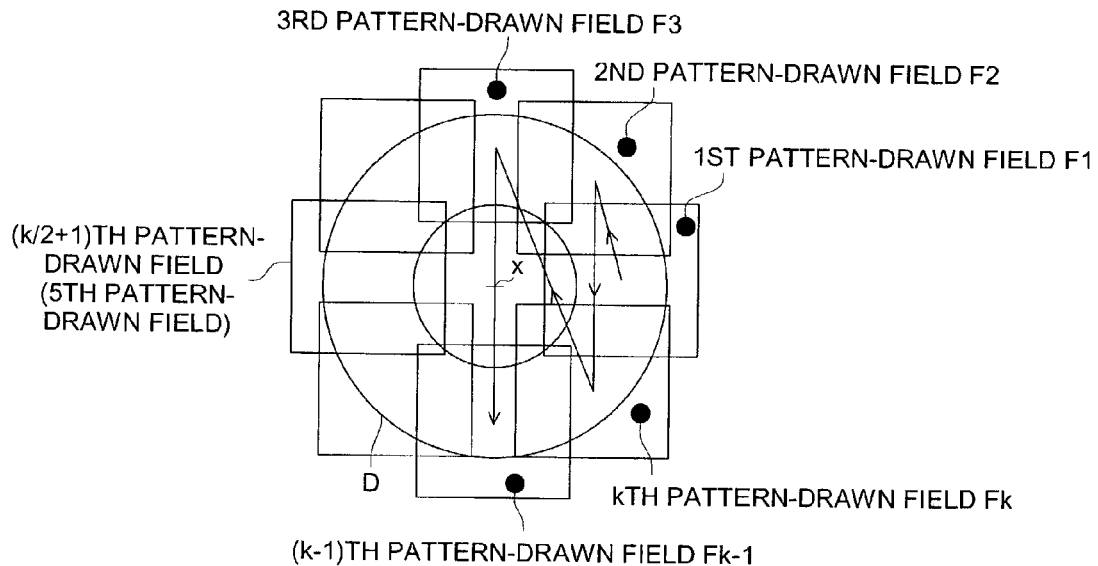
FIG. 20 is a drawing showing a relationship between pattern-drawn fields F1, F2 . . . Fk arranged around an optical axis x as an arbitrary point on a pattern-drawn base material and a pattern D formed by them.

The principle of the present invention will now be described, referring to the drawings. FIG. 20 shows the relationship between pattern-drawn fields F1, F2, - - - Fk on the base material as the object of pattern drawing (hereinafter referred to as a base material) which are arranged around optical axis X as an arbitrary point, and patterns D which can be formed on those field. Based on the characteristics of the beam radiating device, pattern D which can be drawn at a time is limited to the inside of each pattern-drawn field shown by the frames in FIG. 20. After the above-mentioned base material and the beam radiating source are shifted relatively, the patterns obtained by the drawings on each pattern-drawn field, are merged, and circular pattern D can finally be obtained.

However, according to conventional methods, after the pattern is drawn on first pattern-drawn field F1, the base material and the beam radiating device are shifted relatively, and the pattern is drawn on second pattern-drawn field F2, followed by the pattern being drawn on third pattern-drawn field F3, and eventually drawn on the $k^{th}$ pattern-drawn field Fk, and finally pattern D can be formed along the whole circle. However, a time interval results between the pattern drawing on first pattern-drawn field F1 and the pattern drawing on $k^{th}$ pattern-drawn field Fk, whereby the deviation of the beam results and the patterns do not coincide with each other, which is a major problem.

Therefore, in the present invention, after drawing by the beam is performed on the first pattern-drawn field (in this case, first pattern-drawn field F1), concerning the pattern-drawn field which is not the pattern-drawn field (in this case, second pattern-drawn field F2 or $k^{th}$ pattern-drawn field Fk), adjacent to the first pattern-drawn field (in this case, first pattern-drawn field F1), the pattern drawing is performed in the order which is one of the order of the $2^{nd}$ order to $(k-1)^{th}$ order. In other words, the pattern drawing on second pattern-drawn field F2 or $k^{th}$ pattern-drawn field Fk is not performed in the final order ($k^{th}$ order), and thereby, the time interval between the pattern drawing on first pattern-drawn field F1, and the pattern drawing on second pattern-drawn field F2 adjacent to the first field or drawing on $k^{th}$ pattern-drawn field Fk is reduced, and accordingly, the patterns coincide with each other excellently, and precise pattern drawing process can be performed.

Further, it is preferable that, the first pattern-drawn field is determined as a starting point, and the pattern-drawn field, on which the pattern is drawn in 2·s ("s" is an integer not less than 1) order, is positioned in the counter-clock wise direction about an arbitrary point as the center, from the above-mentioned first pattern-drawn field, and still further, the pattern-drawn field, on which the pattern is drawn in (2·s+1) order, is positioned in the clockwise direction about the arbitrary point as the center, from the above-mentioned first pattern-drawn field.

The above-mentioned description is explained referring to FIG. 20. The first pattern-drawn field is determined as a starting point, and the pattern-drawn field (in this case, second pattern-drawn field F2), on which the pattern is drawn in (2×1) order (that is, second order), is positioned in the counter-clock wise direction about the arbitrary point (in this case, the optical axis) as the center, from the first pattern-drawn field (in this case, first pattern-drawn field F1), and still further, the pattern-drawn field (in this case, $k^{th}$ ordered pattern-drawn field Fk), on which the pattern is drawn in $(2×1+1=3^{rd})$ order, is positioned in the clockwise direction about the arbitrary point (in this case, the optical axis) as the center, from the first pattern-drawn field (in this case, first pattern-drawn field F1).

Next, the first pattern-drawn field (in this case, first pattern-drawn field F1) is determined as a starting point, and the pattern-drawn field (in this case, third pattern-drawn field F3), on which the pattern is drawn in $(2×2=4^{th})$ order, is positioned in the counter-clockwise direction about an arbitrary point as the center, from the first pattern-drawn field (in this case, first pattern-drawn field F1), and still further, the pattern-drawn field (in this case, $(k-1)^{th}$ ordered pattern-drawn field Fk-1), on which the pattern is drawn in $(2×2+1=5^{th})$ order, is positioned in the clockwise direction about an arbitrary point (in this case, the optical axis) as the center, from the first pattern-drawn field (in this case, first pattern-drawn field F1). On this occasion, "s" is not less than 2, and accordingly, the patterns have already been drawn on the pattern-drawn field (in this case, third pattern-drawn field or $(k-1)^{th}$ pattern drawing are Fk-1) on which the pattern drawing is being performed and the first pattern-drawn field (in this case, first pattern-drawn field F1). By this process, it is possible to extremely reduce the time interval of drawing on the pattern-drawn fields adjacent to each other.

Figure 21:
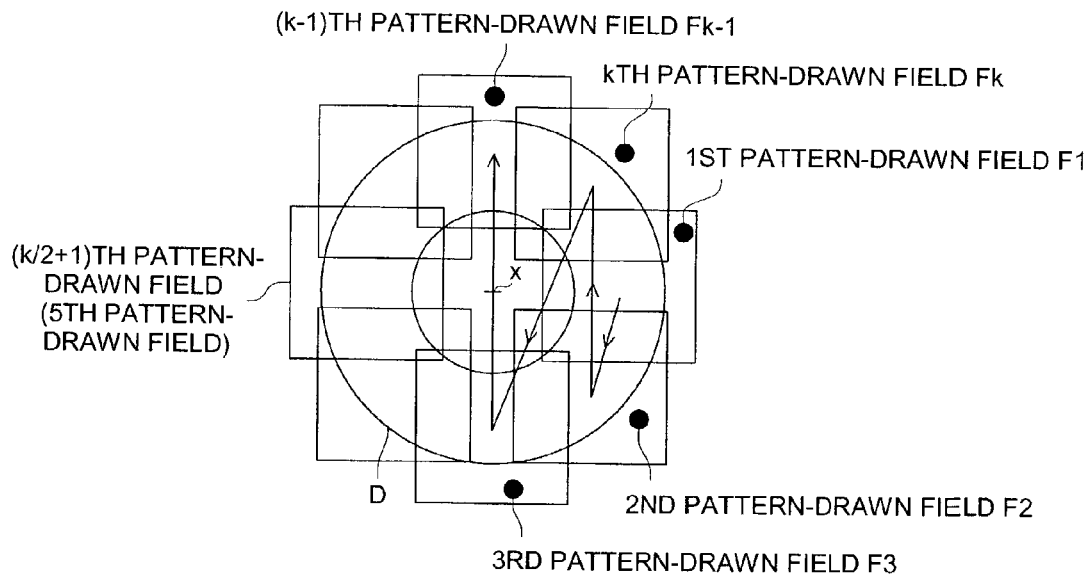
FIG. 21 is also a drawing showing a relationship between pattern-drawn fields F1, F2 . . . Fk arranged around an optical axis x as an arbitrary point on a pattern-drawn base material and a pattern D formed by them as well as FIG. 20. However, the drawing order is different from that in FIG. 20.

It is preferable that, the first pattern-drawn field is determined as a starting point, and the pattern-drawn field, on which the pattern is drawn in 2·s ("s" being an integer not less than 1) order, is positioned in the clockwise direction about an arbitrary point as the center, from the above-mentioned first pattern-drawn field, and still further, the pattern-drawn field, on which the pattern is drawn in (2·s+1) order, is positioned in the counter-clockwise direction about an arbitrary point as the center, from the above-mentioned first pattern-drawn field. This means that the pattern drawings on even ordered fields are performed clockwise, while the pattern drawings on odd ordered fields are performed counter clockwise, which are opposite to the above description. Since the fundamental principles are the same, FIG. 21 is shown without this explanation.

Further, when "s" is not less than 2, it is preferable that the patterns are drawn on the pattern-drawn field on which the pattern drawing is being performed and the pattern-drawn field positioned at the above-mentioned first pattern-drawn field.

Still further, it is preferable that the drawing order is established so that both of the pattern-drawn field on which the pattern is drawn in $m^{th}$ order (1<m<k; "m" is integer), and the pattern-drawn field on which the pattern is drawn in $(m+1)^{th}$ order, are positioned to be substantially symmetrical with respect to the pattern-drawn field on which the pattern was initially drawn.

For example, as one of the methods by which the pattern drawings are performed on the above-mentioned pattern-drawn fields adjacent to each other, within a predetermined order or a predetermined time, the drawing order can be established so that both of the pattern-drawn field on which the pattern is drawn in $m^{th}$ order (1<m<k; "m" is integer), and the pattern-drawn field on which the pattern is drawn in $(m+1)^{th}$ order, are positioned to be substantially symmetrical with respect to the pattern-drawn field on which the pattern was initially drawn. In this case, "symmetrical" means that:

when the first pattern-drawn field is established as the center, both pattern-drawn field (pattern-drawn field "a") among a plurality of the pattern-drawn fields which are connected to one end of the first pattern-drawn field, and a pattern-drawn field (pattern-drawn field "b") among a plurality of the pattern-drawn fields which are connected to the other end of the first pattern drawing, have about the same order or exist about the same distance from the first pattern-drawn field. Let it be assumed that the positional relationship between pattern-drawn field "a" and pattern-drawn field "b" is essentially symmetrical. However it is not necessary that all of the pattern-drawn fields are symmetrical as the above. For example, from the $m^{th}$ order to the $(m+r)^{th}$ order, the pattern drawings are performed on the adjacent pattern-drawn fields in turn, and in the $(m+r+1)^{th}$ order, the pattern-drawn field which is positioned symmetrically with respect to the first pattern-drawn field, is selected, and then the pattern drawing is performed on it, after which pattern drawing can be performed on the adjacent pattern-drawn fields in turn until the $(m+2r)^{th}$ order, by the same way as mentioned above. On this occasion, every r pieces of pattern-drawn fields, the pattern-drawn field largely moves symmetrically with respect to the first pattern-drawn field. The value of "r" is determined within the limit in which deviation of the drawn pattern does not occur.

As mentioned above, the present invention has been explained referring to the present embodiment, but the invention should not be interpreted to be limited to the above-mentioned embodiment, and needless to say, it is possible to modify and to improve the embodiment appropriately. For example, not only an electron beam but also other beams can be employed for the pattern drawing apparatus using an electron beam of the present invention. Further, it is also possible to apply the present invention to not only the molding die to mold the optical element but also to various other kinds of drawings.

As explained above, the present invention can provide a method of drawing a pattern on a base material by scanning a beam and a pattern drawing apparatus using an electron beam which can produce an appropriate form, without excessive cost up nor prolonged manufacturing time.

What is claimed is:

1. A method of drawing a pattern on a base material by scanning an electron beam emitted from an electron beam generator, said method comprising:

drawing a first part of the pattern on a first pattern-drawn field on the base material by scanning the electron beam on the first pattern-drawn field;

shifting the electron beam generator and the base material with respect to each other to position the electron beam generator and the base material for scanning the electron beam on a second pattern-drawn field adjacent to the first pattern-drawn field; and drawing a second part of the pattern on the second pattern-drawn field by scanning the electron beam on the second pattern-drawn field;

wherein the first part of the pattern and the second part of the pattern each include a plurality of ring-shaped zones each of which is formed by a slope portion and a side wall portion; and wherein the electron beam generator and the base material are shifted with respect to each other such that a boundary between the first pattern-drawn field and the second pattern-drawn field is positioned at a joint portion connecting one of said slope portions and one of said side wall portions.

2. The method of claim 1, wherein the base material comprises a base optical surface.

3. The method of claim 2, wherein the base optical surface comprises a curved surface.

4. The method of claim 1, wherein a surface of each side wall portion is parallel to an emitting direction of the electron beam.

5. The method of claim 2, wherein in the pattern, the slope portions and the side wall portions are arranged with a predetermined pitch, and the side wall portions are standing up portions of the base optical surface at respective boundaries between neighboring pitches.

6. The method of claim 2, further comprising:

determining field coordinates to divide the base optical surface into at least the first pattern-drawn field and the second pattern-drawn field based on: configuration data of the base optical surface of the base material, pattern data of the plurality of ring-shaped zones, and a scanning width of the electron beam; and storing first field coordinate data of the first pattern-drawn field and second field coordinate data of the second pattern-drawn field in a storing section;

wherein the field coordinates are determined such that the boundary between the first pattern-drawn field and the second pattern-drawn field is located at the joint portion;

wherein drawing the first part of the pattern comprises: (a) determining a first dose distribution for the first pattern-drawn field based on the first field coordinate data, and (b) drawing the first part of the pattern on the first pattern-drawn field by scanning the electron beam on the first pattern-drawn field based on the first dose distribution;

wherein shifting the electron beam generator and the base material with respect to each other comprises: (a) retrieving the second field coordinate data of the second pattern-drawn field from the storing section, and (b) shifting at least one of the electron beam generator and the base material based on the retrieved second field coordinate data so as to position the electron beam generator and the base material for scanning the electron beam on the second pattern-drawn field; and wherein drawing the second part of the pattern comprises: (a) determining a second dose distribution for the second pattern-drawn field based on the second field coordinate data, and (b) drawing the second part of the pattern on the second pattern-drawn field by scanning the electron beam on the second pattern-drawn field based on the second dose distribution.

7. The method of claim 6, further comprising:

retrieving the first field coordinate data of the first pattern-drawn field from the storing section; and shifting at least one of the electron beam generator and the base material with respect to each other based on the retrieved first field coordinate data so as to position the electron beam generator and the base material for scanning the electron beam on the first pattern-drawn field.

8. The method of claim 6, wherein the first and second pattern-drawn fields are divided so as to be aligned along a circumferential direction of the plurality of ring-shaped zones.

9. The method of claim 1, wherein the plurality of ring-shaped zones comprises a plurality of ring-shaped diffractive zones.

10. A method of drawing a pattern on a base material by scanning an electron beam emitted from an electron beam generator, said method comprising:

determining field coordinates to divide the base optical surface into at least a first pattern-drawn field and a second pattern-drawn field adjacent to the first pattern-drawn field based on: configuration data of the base optical surface of the base material, pattern data of the pattern to be drawn, and a scanning width of the electron beam;

storing first field coordinate data of the first pattern-drawn field and second field coordinate data of the second pattern-drawn field in a storing section;

retrieving the first field coordinate data of the first pattern-drawn field from the storing section;

shifting at least one of the electron beam generator and the base material with respect to each other based on the retrieved first field coordinate data so as to position the electron beam generator and the base material for scanning the electron beam on the first pattern-drawn field;

determining a first dose distribution for the first pattern-drawn field based on the first field coordinate data and the pattern data;

drawing a first part of the pattern on a first pattern-drawn field on the base material by scanning the electron beam on the first pattern-drawn field based on the first dose distribution;

retrieving the second field coordinate data of the second pattern-drawn field from the storing section;

shifting at least one of the electron beam generator and the base material based on the retrieved second field coordinate data so as to position the electron beam generator and the base material for scanning the electron beam on the second pattern-drawn field;

determining a second dose distribution for the second pattern-drawn field based on the second field coordinate data and the pattern data; and drawing a second part of the pattern on the second pattern-drawn field by scanning the electron beam on the second pattern-drawn field based on the second dose distribution;

wherein the first part of the pattern and the second part of the pattern each include a plurality of ring-shaped zones each of which is formed by a slope portion and a side wall portion;

wherein the field coordinates are determined such that a boundary between the first pattern-drawn field and the second pattern-drawn field is positioned at a joint portion connecting one of said slope portions and one of said side wall portions; and wherein the electron beam generator and the base material are shifted with respect to each other such that a boundary between the first pattern-drawn field and the second pattern-drawn field is positioned at a joint portion connecting one of said slope portions and one of said side wall portions.

11. The method of claim 10, wherein the base material has a base optical surface.

12. The method of claim 11, wherein the base optical surface comprises a curved surface.

13. The method of claim 10, wherein a surface of each side wall portion is parallel to an emitting direction of the electron beam.

14. The method of claim 10, wherein in the pattern, the slope portions and the side wall portions are arranged with a predetermined pitch, and the side wall portions are standing up portions of the base optical surface at respective boundaries between neighboring pitches.

15. The method of claim 10, wherein the first and second pattern-drawn fields are divided so as to be aligned along a circumferential direction of the plurality of ring-shaped zones.

16. The method of claim 10, wherein the plurality of ring-shaped zones comprises a plurality of ring-shaped diffractive zones.

* * * * *